United States Patent
Stokes et al.

(10) Patent No.: US 10,338,195 B2
(45) Date of Patent: Jul. 2, 2019

(54) NETWORKABLE SONAR SYSTEMS AND METHODS

(71) Applicant: FLIR Belgium BVBA, Meer (BE)

(72) Inventors: Paul Stokes, Fleet (GB); Matthieu Maindrou, Hampshire (GB); Paul S. Chittenden, Portsmouth (GB)

(73) Assignee: FLIR Belgium BVBA, Meer (BE)

( * ) Notice: Subject to any disclaimer, the term of this patent is extended or adjusted under 35 U.S.C. 154(b) by 92 days.

(21) Appl. No.: 15/592,134

(22) Filed: May 10, 2017

(65) Prior Publication Data

US 2017/0285134 A1    Oct. 5, 2017

Related U.S. Application Data

(63) Continuation-in-part of application No. 15/353,579, filed on Nov. 16, 2016, which is a continuation of
(Continued)

(51) Int. Cl.
*G01S 7/00* (2006.01)
*G01S 7/62* (2006.01)
(Continued)

(52) U.S. Cl.
CPC .............. *G01S 7/003* (2013.01); *G01S 7/521* (2013.01); *G01S 7/52003* (2013.01);
(Continued)

(58) Field of Classification Search
CPC .......... G01S 7/003; G01S 15/96; G01S 15/89; G01S 15/025; G01S 7/52003;
(Continued)

(56) References Cited

U.S. PATENT DOCUMENTS 5,142,649 A    8/1992  O'Donnell
5,530,680 A    6/1996  Whitehurst
(Continued)

FOREIGN PATENT DOCUMENTS

EP    2626721    8/2013
WO   WO 2013/063515    5/2013

*Primary Examiner* — Daniel Pihulic
(74) *Attorney, Agent, or Firm* — Haynes and Boone, LLP

(57) ABSTRACT

Techniques are disclosed for systems and methods to provide networkable sonar systems for mobile structures. A networkable sonar system includes a transducer module and associated sonar electronics and optionally orientation and/or position sensors and/or other sensors disposed substantially within the housing of a sonar transducer assembly, which is coupled to one or more user interfaces and/or other sonar systems over an Ethernet connection. The sonar transducer assembly may be configured to support and protect the transducer module and the sonar electronics and sensors, to physically and/or adjustably couple to a mobile structure, and/or to provide a simplified interface to other systems coupled to the mobile structure. Resulting sonar data and/or imagery may be transmitted over the Ethernet connection and displayed to a user and/or used to adjust various operational systems of the mobile structure.

20 Claims, 9 Drawing Sheets

Related U.S. Application Data application No. PCT/US2015/032304, filed on May 22, 2015.

(60) Provisional application No. 62/335,620, filed on May 12, 2016, provisional application No. 62/005,838, filed on May 30, 2014.

(51) Int. Cl.

| | | |
|---|---|---|
| *G01S 15/87* | (2006.01) | |
| *G10K 11/00* | (2006.01) | |
| *G01S 15/96* | (2006.01) | |
| *G01S 15/02* | (2006.01) | |
| *G01S 7/52* | (2006.01) | |
| *G01S 7/521* | (2006.01) | |
| *G01S 7/524* | (2006.01) | |
| *G01S 15/89* | (2006.01) | |
| *H04L 12/10* | (2006.01) | |
| *H04W 84/12* | (2009.01) | |

(52) U.S. Cl.
CPC .............. *G01S 7/524* (2013.01); *G01S 7/629* (2013.01); *G01S 7/6263* (2013.01); *G01S 15/025* (2013.01); *G01S 15/87* (2013.01); *G01S 15/89* (2013.01); *G01S 15/96* (2013.01); *G10K 11/006* (2013.01); *H04L 12/10* (2013.01); *H04W 84/12* (2013.01)

(58) Field of Classification Search
CPC ........ G01S 7/521; G01S 7/524; G01S 7/6263; G01S 15/87; G01S 7/629; G10K 11/006; H04L 12/10; H04W 84/12
See application file for complete search history.

(56) References Cited

U.S. PATENT DOCUMENTS

| | | | |
|---|---|---|---|
| 5,561,641 | A | 10/1996 | Nishimori et al. |
| 5,675,552 | A | 10/1997 | Hicks et al. |
| 5,771,205 | A | 6/1998 | Currier et al. |
| 5,887,376 | A | 3/1999 | Currier et al. |
| 6,050,945 | A | 4/2000 | Peterson et al. |
| 8,677,920 | B1 * | 3/2014 | Jeng .......................... B63B 3/08 114/312 |
| 9,268,020 | B2 * | 2/2016 | Coleman ................ G01S 7/521 |
| 2004/0158147 | A1 | 8/2004 | Shifrin |
| 2013/0208568 | A1 * | 8/2013 | Coleman ................ G01S 7/521 367/88 |
| 2014/0010049 | A1 | 1/2014 | Proctor |
| 2016/0259520 | A1 * | 9/2016 | Gatland ................ G01S 15/025 |
| 2017/0059705 | A1 * | 3/2017 | Stokes .................... G01S 15/96 |
| 2017/0285134 | A1 * | 10/2017 | Stokes .................... G01S 7/003 |

\* cited by examiner

NETWORKABLE SONAR SYSTEMS AND METHODS

CROSS-REFERENCE TO RELATED APPLICATIONS

This application claims priority to and the benefit of U.S. Provisional Patent Application No. 62/335,620 filed May 12, 2016 and entitled "NETWORKABLE SONAR SYSTEMS AND METHODS," which is hereby incorporated by reference in its entirety.

This application is also a continuation-in-part of U.S. patent application Ser. No. 15/353,579 filed Nov. 16, 2016 and entitled "MULTICHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims priority to and the benefit of U.S. Provisional Patent Application No. 62/005,838 filed May 30, 2014 and entitled "MULTICHANNEL SONAR SYSTEMS AND METHODS," all of which are hereby incorporated by reference in their entirety.

TECHNICAL FIELD

One or more embodiments of the invention relate generally to sonar systems and more particularly, for example, to systems and methods for providing networkable sonar systems.

BACKGROUND

Sonar may be used to perform bathymetry, detect underwater hazards, find fish, and/or otherwise assist in navigation by producing data and/or imagery of a water column beneath a watercraft. Conventional sonar systems often include one or more independently operating sonar transducers with temporally and/or spatially non-overlapping beams arranged to help differentiate ensonifications and produce traditionally recognizable sonar imagery.

Conventional sonar systems typically physically separate their transmitter and receiver electronics from the sonar transducer assembly used to direct the ensonifications into a body of water. Such physical separation requires relatively expensive dual mode analog cabling (e.g., high transmit voltage/power and low receive voltage/power) to be run between the sonar electronics, which are typically placed above water and/or in a watercraft, and the sonar transducer assembly, which is typically operated submerged. Installation of such cabling can itself be expensive and must be performed carefully to minimize mechanical and electrical interference caused by operation of the sonar system and/or the watercraft to which the sonar transducer assembly is mounted. Such disadvantages multiply if additional sonar transducer assemblies are mounted to the same watercraft. Thus, there is a need for an improved methodology to provide compact yet feature-rich and flexible-use sonar systems, particularly in the context of providing relatively high quality sonar data and/or imagery using multiple sonar systems/transducer assemblies associated with the same watercraft.

SUMMARY

Techniques are disclosed for systems and methods to provide networkable sonar systems for mobile structures. A networkable sonar system may include a transducer module and associated sonar electronics and optionally orientation and/or position sensors and/or other sensors disposed substantially within the housing of a sonar transducer assembly, which is coupled to one or more user interfaces and/or other sonar systems over an Ethernet connection. The transducer module may include a single sonar transducer, multiple independent single sonar transducers, or an array of sonar transducers, which may include multiple transmission and/or receive channels/transducer elements. The sonar transducer assembly may be configured to support and protect the transducer module and the sonar electronics and sensors, to physically and/or adjustably couple to a mobile structure, and/or to provide a simplified interface to other systems coupled to the mobile structure. The system may additionally include an actuator configured to adjust an orientation of the sonar transducer assembly. Resulting sonar data and/or imagery may be transmitted over the Ethernet connection and displayed to a user and/or used to adjust various operational systems of the mobile structure.

In various embodiments, a networkable sonar system may include a water temperature sensor, a transducer temperature sensor, a water speed sensor, an orientation sensor, a position sensor, a gyroscope, an accelerometer, and/or one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a sonar transducer assembly including a transducer module and a housing adapted to be mounted to a mobile structure; and sonar electronics disposed within the housing and configured to control operation of the sonar transducer assembly, wherein the sonar electronics are configured to generate an acoustic ensonification; receive acoustic returns, corresponding to the transmitted sonar transmission signal/generated acoustic ensonification, from the transducer module; generate sonar data based, at least in part, on the acoustic returns; and transmit the sonar data to a logic device of the mobile structure over, at least in part, an Ethernet connection.

In another embodiment, a method may include mounting a sonar transducer assembly to a mobile structure, wherein the sonar transducer assembly comprises a transducer module, a housing, and sonar electronics disposed within the housing and configured to control operation of the sonar transducer assembly; and coupling an Ethernet connection to the sonar transducer assembly, wherein the sonar electronics are configured to transmit sonar data to a logic device of the mobile structure over, at least in part, the Ethernet connection.

In another embodiment, a method may include receiving a sonar transducer assembly housing, a transducer module, and sonar electronics; and coupling the transducer module and the sonar electronics at least partially within the housing to assemble a sonar transducer assembly, wherein the sonar electronics are configured to generate an acoustic ensonification; receive acoustic returns, corresponding to the generated acoustic ensonification, from the transducer module; generate sonar data based, at least in part, on the acoustic returns; and transmit the sonar data to a logic device of the mobile structure over, at least in part, an Ethernet connection.

The scope of the invention is defined by the claims, which are incorporated into this section by reference. A more complete understanding of embodiments of the invention

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
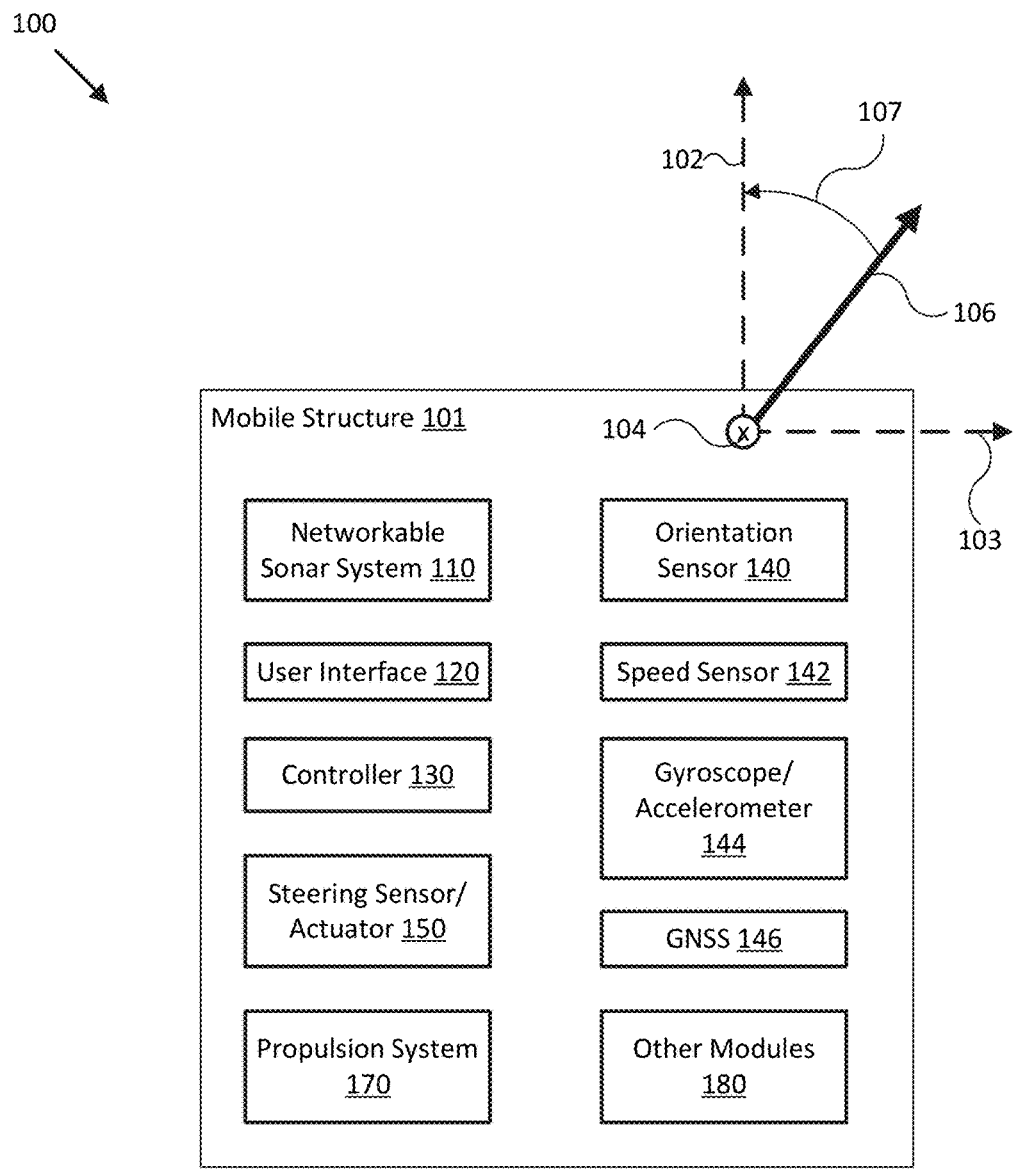
FIG. 1A illustrates a block diagram of a networkable sonar system in accordance with an embodiment of the disclosure.

In accordance with various embodiments of the present disclosure, networkable sonar systems and methods may advantageously include one or more sonar transducer assemblies each including sonar electronics and at least one transducer module in conjunction with a water temperature sensor, a transducer temperature sensor, a water speed sensor, an orientation sensor, a gyroscope, an accelerometer, and/or a position sensor providing measurements of a water temperature, a transducer temperature, a speed, an orientation, an acceleration, and/or a position of the sonar transducer assemblies and/or a coupled mobile structure. For example, the sonar transducer assemblies may be mounted to the mobile structure (e.g., a watercraft, aircraft, motor vehicle, and/or other mobile structure), and the sensors may be mounted to or integrated with the sonar transducer assemblies and/or the sonar electronics coupled within the sonar transducer assemblies.

Embodiments of the present disclosure can be more easily installed onto mobile structures and can reliably produce higher quality sonar data and/or imagery than conventional systems and/or methods by placing the sonar electronics substantially within the same housing used to support the transducer modules operated by the sonar electronics. Such arrangement minimizes the risk of interference and noise caused by operation of sonar systems and/or the mobile structure that might otherwise couple to analog signal cabling used to couple a sonar transducer assembly to a physically separated sonar electronics disposed within or on the mobile structure. Moreover, as described more fully herein, operation of each sonar transducer assembly of a networkable sonar system may be synchronized to each other using the same network connections to transmit and receive sonar data throughout the networkable sonar system.

The standard conventional method for connecting sonar electronics to a sonar transducer is through an interconnecting analog transmission cable that transmits the high voltages to drive the sonar transmitter and receives the low voltages generated by the sonar receiver. Conventionally, these analog signals are processed by a remote set of sonar electronics. The issue with this arrangement is that there are losses in the analog transmission cable that reduce the transmit power output and increase the noise pickup on the receive signals. Embodiments of the present disclosure eliminate these issues by incorporating the sonar electronics within the same housing as the sonar transducer.

In addition, conventional sonar systems typically require both a power connection and a signal connection (e.g., physically separate conductors or cables). Embodiments of the present disclosure provide a method of supporting both signals and power in a single cable using power-over-Ethernet (PoE). Embodiments of the present disclosure also include a method of providing the high power necessary for the sonar transmitter from the limited power available from typical implementations of PoE. In various embodiments, multiple sonar transducer assemblies may be attached to a network, which allows access to multiple control and display units, as described herein.

There are a number of disadvantages with conventional sonar system arrangements that may be eliminated by incorporating the sonar electronics within the same sonar transducer assembly housing as the transducer module (e.g., the module that includes the transducer elements that are energized to create ensonifications of the environment). For example, advantages of including the electronics within the sonar transducer assembly housing, over conventional systems, include: avoiding losses in cable that will reduce the transmit power output; avoiding electromagnetic compatibility (EMC) issues due to emissions from the cable due to high transmit voltages; avoiding noise pickup on the cable to improve receiver signal to noise ratio; avoiding losses in the cable that will reduce receiver sensitivity; communication signals are low voltage digital so the cable cost can be reduced as less insulation and shielding are required; for multiple channel systems (e.g., transducer modules with arrays of transducers/elements), much fewer cores/conductors are required in the cable, again reducing costs; and multiple additional non-sonar sensors can be included in the same housing (e.g., water or transducer temperature, speed through water, orientation sensors, and/or other sensors) without requiring additional or custom cabling.

The use of Ethernet as a method of connecting to a sonar transducer assembly with incorporated sonar electronics, before now, would have been prohibitive due to complexity and cost restraints and/or general poor performance. With the proliferation of high speed Ethernet communication in everyday technology, the price and feasibility has reached a point where Ethernet can be used in such an arrangement for a single transducer, an array of transducers, multiple independent transducers, or combinations of transducers and arrays, as described herein. Advantage of using Ethernet include: high data bandwidths; simple interconnections; plug-and-play capability; and support for general networking concepts and efficiencies.

Additionally, using Ethernet connectivity offers the possibility of supplying power over the signal cores/conductors of a standard Ethernet cable. PoE provides a number of advantages over the traditional battery or power plant supply (e.g., supplied by the power plant of a mobile structure), including: some of the power supply/regulation components and some of the EMC components can be removed from the circuit as the PoE is regulated is implemented with its own EMC components, which can reduce the size and complexity of the PCB and can alleviate any requirements on the size of the transducer; the supply voltage can be isolated from the battery/power plant supply and associated noise and spikes, thus improving the signal to noise and hence the sonar performance; a standard off-the-shelf Ethernet cable and socket can be used rather than a bespoke transducer interconnecting cable, thus reducing costs; and no additional separate power cable would need to be provided, again reducing costs and cable complexity.

In addition, the voltage level provided by a typical PoE implementation (e.g., a statistical minimum of 44V), is higher than the standard battery/power plant voltage of 12V or 24V that is typically available on watercraft. Therefore, in some embodiments, the PoE voltage could be used directly to supply the drive voltage for the sonar transmitter, which can reduce the complexity of the transmitter by eliminating portions of the circuit traditionally used to boost the supply voltage level from the battery/power plant supply to the level needed to produce effective ensonifications. Such arrangement can also remove the associated noise that such boost circuit can generate (e.g., which is generally proportional to the gain of the boost circuit), which then allows embodiments to charge the transmitter voltage/power supply while receiving acoustic returns/echoes. Such receptions would typically otherwise be swamped by the noise generated by the boost circuit during the charging time. Moreover, allowing the transmitter voltage/power supply to charge while acoustic returns are being received reduces or eliminates the need for a momentary high charge current because the same total amount of power can be accumulated using a lower current over a longer time.

In order to use PoE, the sonar electronics need to be carefully designed to take advantage of the available power because of the PoE implementation's typical limited power capability. As discussed, the conventional method of charging the transmitter supply (e.g., a bank of capacitors or other charge accumulation devices) operates by pulling high currents from the power plant supply over a short period of time. Such high currents are not available with typical implementations of PoE, so an alternative low current slow charge method can be employed.

A design for a charge circuit that would regulate PoE supply voltages and be used for the sonar transmitter is provided herein. For example, power may be provided by the Ethernet connection and tapped off to a set of rectifiers to provide a raw PoE power/voltage supply. This raw supply may be routed through a PoE power supply unit (PSU) to provide the supply rails for the electronics, and the same raw supply routed to a charging circuit for the sonar power amplifier. In various embodiments, the charging circuit includes a current limiter to regulate the amount of current that would be drawn from the supply to a value within the instant capabilities of the PoE implementation. The charging circuit may also include an isolation circuit or switch configured to electrically decouple the sonar power amplifier from the PoE supply and the remaining sonar electronics during the power amplifier's transmitting phase, thus reducing or eliminating the signal noise that would otherwise be fed back onto the sonar electronics and/or the Ethernet connection. In some embodiments, the isolation circuit may be controlled by control logic also configured to control the transmitting phase, as described herein.

In some embodiments, a sonar transducer assembly with sonar electronics and an Ethernet connection can be configured for wireless data communications with the addition of a wireless access point (e.g., configured to support Bluetooth™, WiFi, and/or other substantially local area wireless communication protocols) implemented with a PoE converter. In various embodiments, the PoE converter may include a PoE supply, which can be used to power the sonar transducer assembly, as described herein.

Often, it can be advantageous to be able to synchronize multiple physically separate sonar transducer assemblies and/or other systems that are attached to the same network, such as networkable sonar systems, radar systems, and various sensors, such as orientation and positional sensors. Because the networkable sonar systems (and possibly the other sensor systems) are coupled to each other, at least in part, through an Ethernet connection, one option to synchronize their operation is through the use of Precision Time Protocol (PTP), which is able to synchronize timing circuitry or clocks throughout the devices coupled to the network. As described herein, such synchronization requires Ethernet hardware that can support PTP and software designed to apply this protocol to work with an application to sonar. For example, with such synchronization, networkable sonar transducer assemblies can be synchronized to avoid interference or to improve data fusion of multiple sources of data.

Multiple sonar transducer assemblies and/or systems operating on the same vessel or structure can cause cross-interference that degrades the sonar data and/or imagery. It is generally advantageous to synchronize the systems in order to schedule transmissions to reduce or eliminate the interference. Conventional methods use a single external controlling device for all sonars or a hard wired triggering approach that has a dedicated proprietary method and wiring to control the transmissions. These methods all require bespoke or expensive third party devices.

An alternative approach is to use a direct link communications link where a signal can be sent down the conductor and the receiving device can react immediately. While this approach can be cheaper, such systems typically have limited communication bandwidth available. By contrast, an unmodified Ethernet connection provides a much higher bandwidth but does not provide a direct hardware line that can be used to provide a fast reaction time signal/trigger. Moreover the intermediate components that are typically fitted in an unmodified Ethernet based network can have high latency that can cause an indeterminate and variable delay to signals passed over the network. Therefore, a different approach can be implemented in order to synchronize systems solely over an Ethernet connection while reaping the benefit of Ethernet's increased communication bandwidth.

Embodiments of the present disclosure exploit networking protocols that support the synchronization of timing circuitry/clocks for devices attached to a network, such as the Precision Timing Protocol that is defined in IEEE standard 1588-2002 and 1588-2008. Once the systems are synchronized, scheduling methods may be employed to reduce interference between sonar transducer assemblies and/or systems and to combine data from multiple sources that produce accurately time stamped data. For example, such systems may include a network infrastructure that connects multiple sonar transducer assemblies and/or systems and non-sonar sensors to each other, all of which support synchronization over Ethernet such as PTP.

A scheduling system and/or software (e.g., a scheduler) may be used to organize or control the timings of transmissions for all networkable sonar systems attached to the network to reduce or eliminate interference. A combining or sensor fusion system and/or software (e.g., a fusor) may be configured to collate information from multiple sources with synchronized clocks and to register and/or align data and/or imagery for display. Such fusor may be combined with multiple networkable sonar systems and be configured to exploit the high accuracy of timing circuitry or clocks to compare time of arrival of echoes and estimate 3D position of targets. The fusor may be configured to combine sensor data (e.g., sonar data and/or imagery) from multiple similar sources of data with synchronized operation (e.g., synchronized timing circuitry and/or clocks) in order to improve data fidelity.

In various embodiments, implementation of PTP over Ethernet can be conducted according to the IEEE standard and can be implemented purely in software, for example, or can be enhanced with various forms of hardware support. The software approach requires a PTP synchronizing application (e.g., bespoke client/server software or open source software such as the PTP application for Linux called PTPd) running on various elements of the network and can achieve system to system synchronization accuracy to within 10 to 100 microseconds. Such accuracy is adequate to synchronize non-sonar sensors, but it typically would not be sufficient to synchronize shallow water operation of networkable sonar systems sufficient to, for example, allow sonar data from different systems to be combined to increase data fidelity reliably.

Hardware support requires a PTP synchronizing application or interface and network hardware components that support PTP and/or logic devices (e.g., ASIC or FPGA) with real time access to the timing circuitry/clocks. With hardware support, sub-microsecond synchronization accuracies are possible, which is suitable for reducing interference between sonar systems, increasing data fidelity using sonar data from multiple physically separate sources, and for combining sonar data from multiple systems for estimates of target positions in 3D. Sub-microsecond synchronization accuracies typically require each element of the Ethernet network to support PTP (e.g., including various intermediate network hubs or switches). In some embodiments, PTP can be implemented over a wireless communication link (e.g., WiFi and/or other wireless protocols), which offers the opportunity to synchronize networkable sonar systems and/or other sensor systems that are not interconnected using wired communication links.

A difficulty for a scheduler that relies on PTP is the latency of messages transmitted across the network. For a conventional hardwired trigger system, a 'start to transmit' signal or a 'hold off while another system transmits' signal can be immediately transmitted down the line and immediately received. For a PTP synchronized system, operational control directives must be packed into the relevant protocol and sent with no guarantees for the time taken to deliver the message or for the time needed for the receiver to interpret the message. In some cases, such as for a relatively large network with multiple different nodes, additional delays can be introduced due to intermediate distribution electronics (e.g., hubs and switches) that can receive a network message, interpret the message, and act accordingly, before passing the message to the appropriate receiving device. Therefore, the scheduler must allow for or otherwise compensate for these variations in the delay.

The typical requirements for such a scheduler are often conflicting: the scheduler adjusts the timing of ensonifications on all operating networkable sonar systems to reduce or eliminate interference, which can reduce ensonification rates, while minimizing such reduction because lower ensonification rates reduces the resolution of the sonar data and/or the visual quality of any resulting sonar imagery. For example, typically the best interference rejection (and the slowest ensonification rate) can be achieved through a schedule where each of the sonars on the network ping individually in a sequence. The next best interference rejection, but with limited effect on the ensonification rate, would be for the scheduler to force all of the sonars to ping simultaneously, for example, or for one sonar to provide a single ping for all of the sonars. This can eliminate the interference from the 'bang' of the ensonification(s) because all the participating sonars could be transmitting and/or receiving at the same time, and so all the sonars would not be configured to receive acoustic returns during the ensonification(s) and would not be detrimentally affected by, for example, receiver/signal saturation during the transmitted ensonification(s). The acoustic returns may interfere with each other, but such interference can be reduced by avoiding operation at overlapping frequencies and/or avoiding spatially overlapping ensonification beams. A common ensonification rate may be determined or set by the networkable sonar system that takes the longest period of time to ensonify and complete acquisition of corresponding acoustic returns. In addition, receiver time periods (e.g., for data acquisition) may be synchronized and/or staggered to reduce interference effects and/or to enhance resulting sonar imagery.

Implementing a schedule and taking into account the network delays without significant detriment to the ensonification rates can be difficult. For example, in the context of shallows (e.g., short distances between the transducer module and a hard environmental surface, such as the floor of a body of water), acceptable ensonification rates can be approximately 50 pings per second, or a time between pings of 20 ms, and the transmission bursts for each such ensonification may be approximately tens of microseconds long. The typical latency in a LAN Ethernet network is approximately 200 µs, and so a poor scheduling system design could severely misalign transmission bursts or severely reduce ensonification rates. In fact, this example shows that a scheduling system that relies solely on control commands being sent over an Ethernet network to instigate each ensonification would typically not work well in shallows, where quickly updated sonar data is often required for safe navigation. Instead, an ensonification schedule (e.g., sent over the network) and synchronized systems configured to implement the ensonification schedule would be desirable.

The time to complete an ensonification and receive corresponding acoustic returns (the minimum time between pings) can vary on the same sonar transducer assembly (e.g., due to transducer heating, processing difficulty, and/or other issues), and can vary between assemblies, and a robust ensonification schedule is able to take such variability into account. For example, in the case of synchronizing the ensonifications of all systems (e.g., where all systems ping at the same time, for example, or one system provides a single ping for all systems), the ensonification schedule could allow for the worst case (longest) time for a system to ping and be ready to ping again, or it could instead allow each system to drop a scheduled ping if individually it is not ready to ping again. Unfortunately, both options would potentially reduce the overall effective ensonification rate.

One method to counteract this type of system degradation is to use an adaptive scheduler that uses feedback from each of the systems attached to the network to indicate successful pings, the times between pings, and when each individual system is ready to ping again, for example. The adaptive scheduler can be configured to generate statistics based on previous ensonifications or series of ensonifications and adjust the timings in the ensonification schedule to minimize the impact on ensonification rates. The adaptive scheduler can also be configured to use such statistics to dynamically adjust the timings (e.g., through use of a dynamically updated ensonification schedule) to minimize the impact on ensonification rates.

In various embodiments, accurate knowledge of the time at which sonar data is acquired can provide a considerable improvement on the quality of combined sonar data, as compared to sonar data from a single sonar transducer assembly or system. For example, if the network couples a number of sensors providing the same type of data (e.g., orientation or attitude information of the mobile structure), then the data from the multiple sources can be combined to reduce various inaccuracies in the data, such as those caused by random noise and/or various environmental factors or offsets.

Combining data from different types of sensors can also be enhanced. For example, a networkable sonar system can time stamp its sonar data, and a fusor can combine such data with time stamped attitude data from an attitude sensor and, if the systems/time stamps are properly synchronized, apply corrections to the sonar data and/or compensate for mobile structure attitude (e.g., to improve sonar images by reducing noise and/or registration errors due to factors such as boat roll, pitch, yaw, and heave). Similar methods may be used to increase the accuracy of multiple different orientation sensors, for example, such as one within a sonar transducer assembly housing and one mounted separately to remote portion of the same watercraft.

As described herein, PTP can provide a synchronization accuracy of in the sub microsecond range, which offers the opportunity to measure the time of arrival from a target using multiple networkable sonar systems and then using trilateration or multilateration to estimate the position of the target in 3 dimensions. For example, in embodiments with three different networkable sonar transducer assemblies or systems, each may be synchronized to each other with sub microsecond accuracy over a network using PTP. Assuming each assembly detects the same target, the time stamped time of arrival from the target as measured at each of the assemblies can be accurately determined. With the knowledge of the positions and orientations of the assemblies on the mobile structure, and the time stamped ranges to target reported by the assemblies, the position of the target in three dimensional space can be calculated using mathematical techniques such as trilateration. If multiple sonars are available, improved accuracy of the position of the target can be achieved through multilateration or similar techniques.

Similar sonar data processing can be extended to multiple targets or multiple echoes from a single target or surface (e.g., a sea floor) to generate a full 3D representation of the underwater environment from networkable sonar systems that are not individually designed to produce 3D data nor normally configured to be combined to produce 3D data. Embodiments of the present disclosure offer the potential for an inexpensive 3D sonar system or for very large base line 3D sonar systems. Moreover, while the techniques disclosed herein are described primarily in the context of sonar, it should be understood that the various techniques may be modified to accommodate other ranging systems, such as radar or LIDAR, which would also benefit from the synchronization, exploitation, and sensor data processing techniques described herein.

FIG. 1A illustrates a block diagram of system 100 in accordance with an embodiment of the disclosure. In various embodiments, system 100 may be adapted to form a network including at least networkable sonar system 110, to schedule operation of various elements of system 100, and/or fuse sensor data from various elements of system 100 into a cohesive whole, as described herein. For example, system 100 may control operation of networkable sonar system 110 and/or other elements of system 100 to form various views of sonar data provided by sonar system 110. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of sonar system 110, user interface 120, a controller 130, an orientation sensor 140, a speed sensor 142, a gyroscope/accelerometer 144, a global navigation satellite system (GNSS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Networkable sonar system 110 may be implemented as one or more electrically and/or mechanically coupled controllers, transmitters, receivers, transceivers, signal processing logic devices, various electrical components, transducer elements of various shapes and sizes, single or multichannel/array transducers/transducer modules, assembly brackets, transom brackets, and/or various actuators adapted to adjust orientations of any of the components of sonar system 110, as described herein. Networkable sonar system 110 may be configured to emit one, multiple, or a series of acoustic beams (e.g., ensonifications), receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein. For example, in some embodiments, sonar system 110 may be implemented according to any of the systems and/or methods described within International Patent Application No. PCT/US2015/032304 filed May 22, 2015 and entitled "MULTICHANNEL SONAR SYSTEMS AND METHODS," which is hereby incorporated by reference in its entirety.

In some embodiments, sonar system 110 may be implemented using a compact design, where multiple sonar transducers, sensors, and/or associated sonar electronics are located within a single sonar transducer assembly housing that is configured to interface with the rest of system 100 through a single Ethernet cable providing power and/or communications to and from sonar system 110. In some embodiments, sonar system 110 may include various additional sensors, such as a water temperature sensor, a transducer temperature sensor, a water speed sensor, and/or orientation and/or position sensors configured to help provide two or three dimensional waypoints, increase sonar data and/or imagery quality, and/or provide highly accurate bathymetry data, as described herein.

For example, in the context of sea based sonar, fisherman desire highly detailed and accurate information and/or imagery of underwater structure and mid water targets (e.g., fish). Conventional sonar systems are relatively expensive and bulky and typically cannot be used to provide enhanced underwater views, as described herein. Embodiments of sonar system 110 provide a low cost networkable sonar system that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable, which may be implemented with power over Ethernet).

In various embodiments, sonar system 110 may be configured to provide many different display views from a variety of selectable perspectives, including down imaging, side imaging, and/or three dimensional imaging, all using the same hardware but with different selectable configurations and/or processing methods, as described herein. In some embodiments, sonar system 110 may be implemented with a single sonar transducer assembly housing incorporating one or more transducer modules and associated sonar electronics. Such embodiments can reduce overall system cost because, for example, a multi-way interface cable is not needed. Such embodiments may also provide improved image quality by locating transmission and receiver electronics close to their corresponding transmission and receive transducers/channels, which can drastically improve signal to noise relative to systems that transmit and/or receive analog signals over long cabling to other elements of system 100.

In general, embodiments of sonar system 110 may be configured to transmit acoustic beams/ensonifications using a single transmission channel and/or element of a transducer module, receive corresponding acoustic returns using a receive channel and/or element of the transducer module, and to process the acoustic returns to produce high quality two and/or three dimensional sonar imagery, as described herein. In some embodiments, one or more sonar transmitters of sonar system 110 may be configured to use chirp signals to improve range resolution, for example.

In some embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of waypoints remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a water bed or floor.

In embodiments where sonar system is implemented with an orientation and/or position sensor, sonar system 110 may be configured to store such location/position information along with other sensor information (acoustic returns, various temperature measurements, text descriptions, water depth, altitude, mobile structure speed, and/or other sensor and/or control information) available to system 100. In some embodiments, controller 130 may be configured to generate a look up table (e.g., based on historical cross referencing of configurations and geolocation) so that a user can select desired configurations of sonar system 110 for a particular location or to coordinate multiple types of sensor information. Alternatively, an automated adjustment algorithm can be used to select optimum configurations based on the sensor information.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, synchronization signals, ensonification and/or sensor operation schedules, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wired or wireless networking protocol and/or parameters for a particular wired or wireless networking protocol and/or wireless link (e.g., a password, an encryption key, a MAC address, a device identification number, a device operation profile, parameters for operation of a device, PTP parameters, and/or other parameters), to select elements of system 100 to synchronize (e.g., using PTP), to synchronize operation of elements of system 100, to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. In various embodiments, user interface 120 may be configured to fuse sensor data received from multiple elements of system 100, as described herein.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In some embodiments, user interface 120 may be implemented with power circuitry configured to receive or provide PoE, for example.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, scheduling operation of various sensors, fusing sensor data received from various sensors, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global navigation satellite system receiver (e.g., a GPS receiver) and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a transducer temperature sensor, a barometer, a radar system, a LIDAR system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to generate an acoustic pulse (e.g., a transmission control signal and/or a digital shaping control signal), convert the acoustic pulse to an excitation signal (e.g., a shaped or unshaped sonar transmission signal) and transmit it to a sonar transducer element to produce an acoustic beam/ensonification, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, power regulation circuitry, and/or other components, and such sharing may act to reduce and/or substantially eliminate such timing errors while reducing overall system complexity and/or cost.

Each element of system 100 may include one or more batteries or other electrical power storage devices (e.g., other modules 180), for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100. Additionally, each element of system 100 may include power circuitry configured to receive or provide PoE, as described herein.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
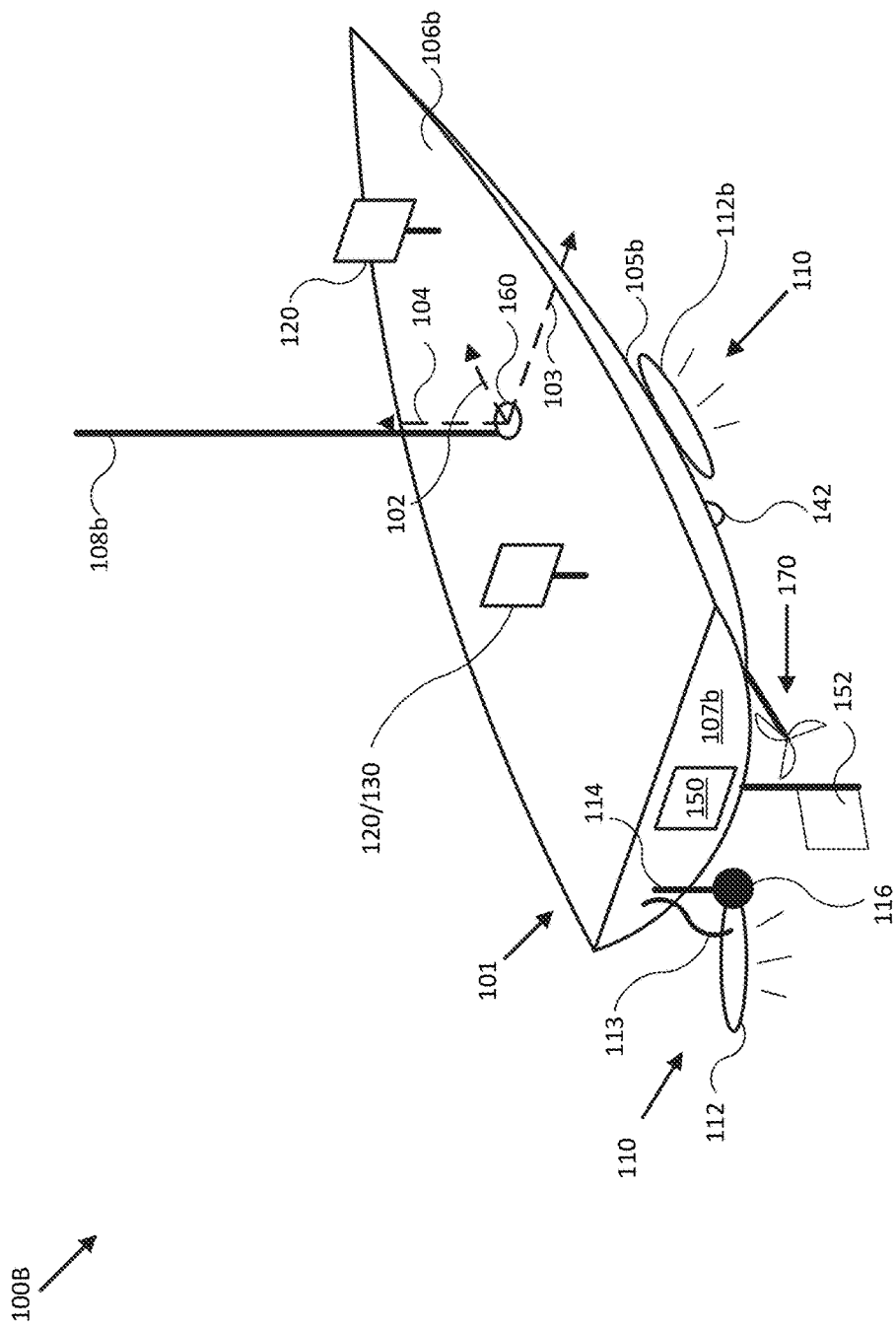
FIG. 1B illustrates a diagram of a networkable sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1A. For example, system 100B may include networkable sonar system 110, integrated user interface/controller 120/130, secondary user interface 120, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, an actuated sonar transducer assembly 112 coupled to transom 107b, and a sonar transducer assembly 112b mounted to hull 105b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes networkable sonar system 110, which in turn includes actuated sonar transducer assembly 112 coupled to transom 107b of mobile structure 101 through assembly bracket/actuator 116 and transom bracket 114, and sonar transducer assembly 112b coupled directly to hull 105b. Both sonar transducer assemblies 112 and 112b are configured to communicate with user interface/controller 120/130 and/or receive power from mobile structure 101 over an Ethernet connection, though only Ethernet connection/cable 113 is explicitly shown in FIG. 1B.

In some embodiments, assembly bracket/actuator 116 may be implemented as a roll, pitch, and/or yaw actuator, for example, and may be adapted to adjust an orientation of sonar transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of sonar transducer assembly 112 configured to ensonify a portion of surrounding water and/or a direction referenced to an absolute coordinate frame, and to adjust an orientation of sonar transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of sonar transducer assembly 112 to direct sonar transmissions from sonar transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. In a further embodiment, interface/controller 120/130 may be configured to schedule ensonifications of sonar transducer assemblies 112 and/or 112b to reduce cross interference, for example, or to eliminate registration errors caused by movement of mobile structure 101 (e.g., to sync ensonifications with particular motions or orientations of mobile structure 101 or either of sonar transducer assemblies 112/112b.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation).

In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 (and/or sonar transducer assemblies 112/112b) may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
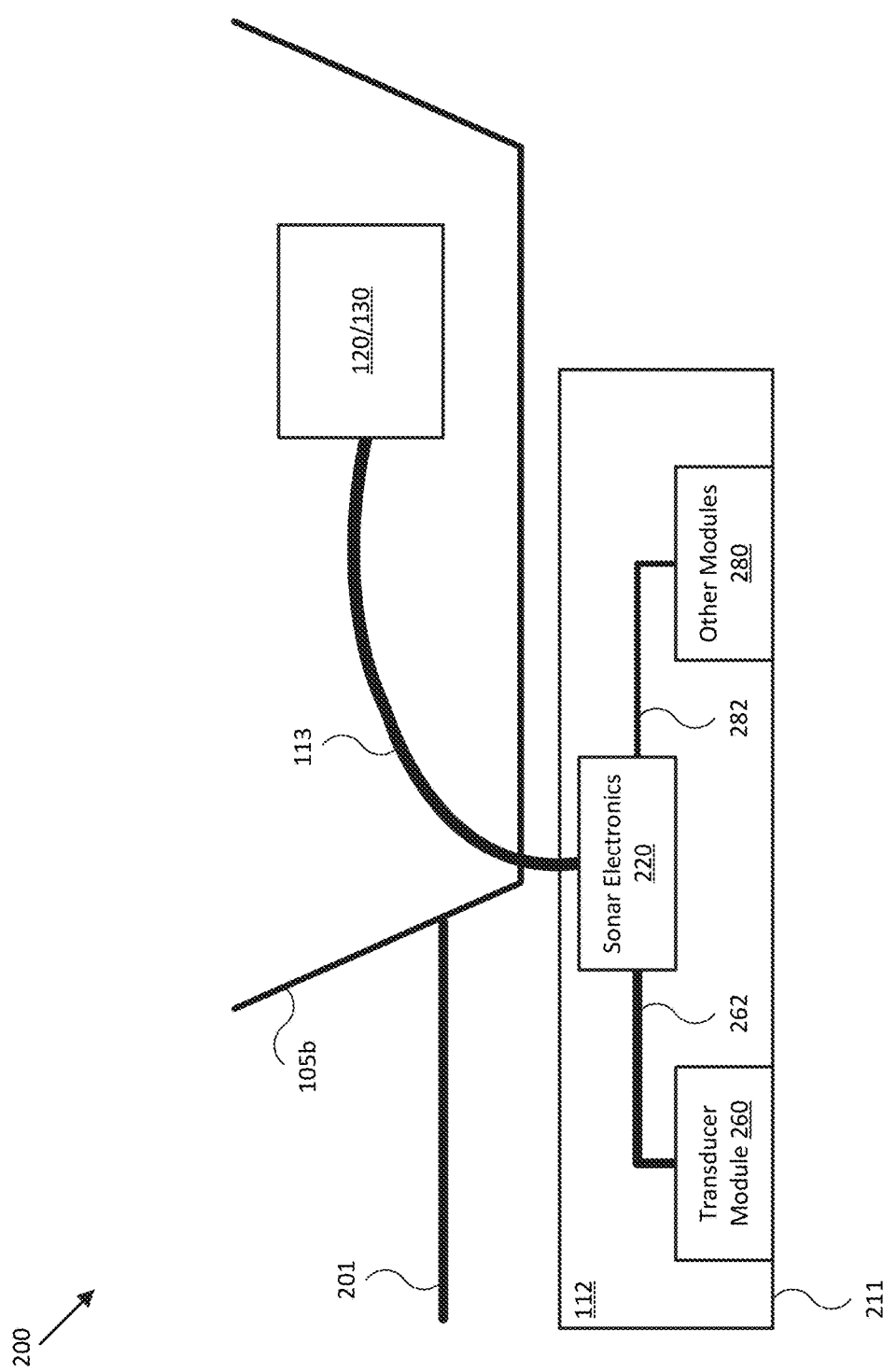
FIG. 2A illustrates a diagram of a networkable sonar system in accordance with an embodiment of the disclosure.

FIG. 2A illustrates a diagram of a networkable sonar system 200 in accordance with an embodiment of the disclosure. In the embodiment shown in FIG. 2A, networkable sonar system 200 includes a sonar transducer assembly 112 substantially below water line 201 that can be coupled to a user interface and/or a power source (e.g., user interface/controller 120/130 of FIG. 1B) through a single Ethernet connection/cable 113 penetrating through or routed around hull 105b. As shown, sonar transducer assembly 112 may include sonar electronics 220 coupled to one or more transducer modules 260 (e.g., single sonar transducer modules, multiple independent single sonar transducer modules, or an array of sonar transducer modules) over leads 262, other modules 280 (e.g., water temperature sensors, transducer temperature sensors, water speed sensors, and/or orientation and/or position sensors) over leads 282, and/or other devices facilitating operation of system 200 all disposed within a common housing 211. In other embodiments, one or more of the devices shown in FIG. 2A may include a more extensive network and include multiple embodiments of sonar transducer assembly 112 each coupled to user interface/controller 120/130 through one or more network switches or hubs, wireless access points, and/or other network interface devices. Leads 262 and 282 may in some embodiments be implemented as Ethernet connections, for example, and/or other electrical and/or communication cables.

Sonar electronics 220 may include any appropriate logic devices (e.g., processing devices, microcontrollers, processors, application specific integrated circuits (ASICs), field programmable gate arrays (FPGAs), memory storage devices, memory readers, or other devices or combinations of devices) that may be adapted to execute, store, and/or receive appropriate instructions, such as software instructions implementing a control loop for controlling various operations of sonar transducer assembly 112 and/or system 200, for example, similar to controller 130. In typical embodiments, sonar electronics 220 may be tasked with overseeing general operation of sonar transducer assembly 112, generating sonar data and/or imagery from acoustic returns, correlating sensor data with sonar data/imagery, communicating operational parameters and/or sensor information with other devices through Ethernet connection 113, and/or other operations of system 200. More generally, sonar electronics may be configured to perform any of the methods or processes described herein. Sonar electronics 220 may also be implemented with relatively high resolution timing circuitry capable of generating digital transmission and/or sampling control signals for operating transmitters, receivers, transceivers, signal conditioners, and/or other elements of sonar electronics 220, for example, and other time critical operations of system 200, such as per-sample digital beamforming and/or interferometry operations applied to acoustic returns from transducer module 260 and/or other sonar transducer assemblies, as described herein.

Sonar electronics 220 may in some embodiments be implemented with a sonar transmitter including one or more digital to analog converters (DACs), signal shaping circuits, filters, phase adjusters, signal conditioning elements, power amplifiers, timing circuitry, logic devices, and/or other digital and/or analog electronics configured to generate transmission signals to excite a transmission channel/transducer element of transducer module 260 to produce one or more acoustic beams/ensonifications. In some embodiments, operation of a sonar transmitter (e.g., amplification, frequency dependent filtering, transmit signal frequency, duration, shape, and/or timing/triggering, and/or other signal attributes), may be controlled (e.g., through use of various control signals) by sonar electronics 220, as described herein.

Sonar electronics 220 may also include one or more sonar receivers including one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of transducer module 260, and convert the analog acoustic returns into digital acoustic returns. In some embodiments, operation of a sonar receiver (e.g., amplification, frequency dependent filtering, basebanding, sample resolution, duration, and/or timing/triggering, and/or other ADC/signal attributes) may be controlled by sonar electronics 220. For example, sonar electronics 220 may be configured to convert an acoustic return into a digital acoustic return comprising one or more digital baseband transmissions. In some embodiments, sonar electronics 220 may be configured to low-pass or otherwise filter, amplify, decimate, and/or otherwise process the acoustic and/or digital acoustic returns (e.g., using analog and/or digital signal processing). In further embodiments, a sonar transmitter and a sonar receiver of sonar electronics 220 may be integrated into a single transceiver.

In various embodiments, transducer module 260 may include multiple transducer elements and/or transmission/receive channels that may be operated substantially independently of each other and be configured to emit acoustic beams and receive acoustic returns through housing 211. In some embodiments, transducer module 260 may include a single transmission channel and, separately, multiple receive channels. In other embodiments, transducer module 260 may include multiple transmission channels. In further embodiments, each transmission channel may be implemented as both a transmission channel and a receive channel though use of a transceiver. In general, each transmission channel may be implemented as one, two, or many separate transducer elements configured to produce one or more acoustic beams. Each receive channel may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the one or more channels of transducer module 260 may be arranged to facilitate multichannel processing, such as beamforming, interferometry, interbeam interpolation, and/or other types of multichannel processing used to produce sonar data and/or imagery.

For example, in one embodiment, transducer module 260 may be implemented with multiple transmission channels arranged in a phased array to allow electronic steering of relatively narrow acoustic beams (relative to those produced by a single transmission channel) within a relatively wide range of transmission angles. In such embodiments, sonar transducer assembly 112 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, sonar transducer assembly 112 may be implemented with one or more additional transducer modules (e.g., other modules 280) separate from transducer module 260. Typically, additional transducer modules may be configured to produce acoustic beams adapted to reduce or eliminate interference with operation of transducer module 260, such as by using a substantially different transmission frequency, timing, and/or shape, and/or by aiming the acoustic beams in a substantially non-interfering/overlapping direction. In alternative embodiments, additional transducer modules may be configured to generate acoustic beams that produce acoustic returns in transducer module 260, but from an oblique angle relative to transducer module 260. In such embodiments, the oblique acoustic returns may be used to generate sonar imagery with increased spatial differentiation and/or contrast between objects in the water column ensonified by sonar transducer assembly 112. Likewise, networkable sonar system 200 may include additional sonar transducer assemblies, similar to sonar transducer assembly 112, configured to work in conjunction with sonar transducer assembly 112 and controlled by user interface/controller 120/130 and/or synchronized, at least in part, over Ethernet connection 113, as described herein.

In various embodiments, other modules 280 may include a water temperature sensor, which may be a digital and/or analog thermometer, sound cell, and/or other analog or digital device configured to measure a temperature of water near sonar transducer assembly 112 and provide a corresponding sensor signal to sonar electronics 220 over leads 282. Other modules 280 may also include a transducer temperature sensor configured to monitor or measure the temperature of transducer module 260 and/or transducer elements of transducer module 260. Other modules 280 may in some embodiments include a water speed sensor, configured to measure the speed of sonar transducer module 112 relative to surrounding water, as described herein. Other modules 280 may also include an orientation/position sensor integrated with sonar transducer assembly 112 and implemented as one or more orientation sensors, GNSS receivers, differential GPS sensors, orientation/position reference transducers and/or optical sensors (e.g., for actuators), and/or other sensors configured to measure a relative and/or absolute orientation and/or position of sonar transducer assembly 112 and/or transducer module 260 and provide such measurements to sonar electronics 220.

In some embodiments, sonar electronics 220 may be configured to combine sonar data and/or imagery according to such other sensor measurements and/or measurements of an orientation and/or position of a coupled mobile structure to produce combined sonar data and/or imagery, such as multiple co-registered sonar images, for example, and/or three dimensional sonar images. In other embodiments, sonar electronics 220 may be configured to use orientation and/or position measurements of sonar transducer assembly 112 and/or a coupled mobile structure to control one or more actuators (e.g., other devices 280) to adjust a position and/or orientation of sonar transducer assembly 112 and ensonify a particular position and/or orientation using sonar transducer assembly 112 and/or transducer module 260.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of sonar transducer assembly 112. In some embodiments, other devices 280 may include a visible spectrum camera, an infrared camera, and/or other environmental sensors providing measurements and/or other sensor signals that can be displayed to a user and/or used by other devices of sonar transducer assembly 112 (e.g., sonar electronics 220) to provide operational control of sonar transducer assembly 112. In some embodiments, other devices 280 may include one or more actuators adapted to adjust an orientation (e.g., roll, pitch, and/or yaw) and/or a position (longitudinal, lateral, and/or vertical) of sonar transducer assembly 112, transducer module 260, and/or other elements of sonar transducer assembly 112, relative to a coupled mobile structure, in response to one or more control signals (e.g., provided by sonar electronics 220 and/or user interface/controller 120/130). In other embodiments, other devices 280 may include one or more brackets, such as a transom bracket, adapted to couple housing 211 to hull 105b.

In various embodiments, sonar transducer assembly 112 may be implemented in a single housing 211 with a single interface (e.g., Ethernet connection 113) to simplify installation and use. For example, Ethernet connection 113 may be implemented as a PoE capable connection supporting transmission of both high bandwidth communications and power between sonar transducer assembly 112 and elements of a coupled mobile structure. Such communications and/or power may be delivered over Ethernet connection 113 sonar electronics 220, which may include one or more power conditioners, line filters, switching power supplies, DC to DC converters, voltage regulators, power storage devices (e.g., batteries), and/or other power supply devices configured to receive power over Ethernet connection 113 and/or distribute power to the various elements of sonar transducer assembly 112.

Figure 2B:
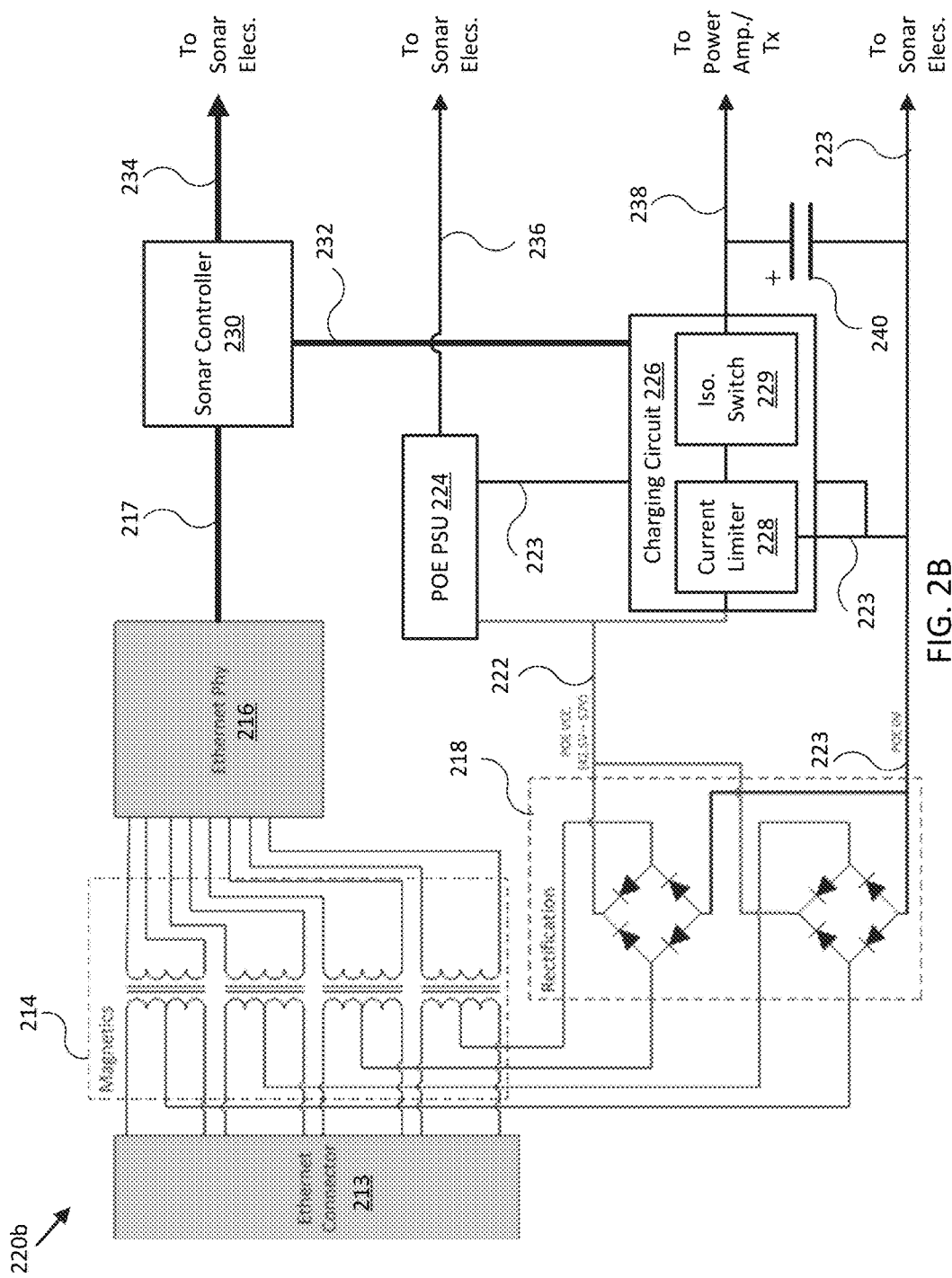
FIG. 2B illustrates a diagram of sonar electronics for a networkable sonar system in accordance with an embodiment of the disclosure.

FIG. 2B illustrates a diagram of sonar electronics 220b for a networkable sonar system in accordance with an embodiment of the disclosure. For example, sonar electronics 220b of FIG. 2B may represent a portion of sonar electronics 220 of FIG. 2A configured to interface with Ethernet connection 113 and provide power and support communications to and from various elements of sonar electronics 220.

As shown in the embodiment illustrated by FIG. 2B, sonar electronics 220b includes Ethernet connector 213 coupled to data isolation circuitry 214 and power conditioning circuitry 218, as shown. For example, Ethernet connection 113 of FIG. 2A may be fitted to Ethernet connector 213 to provide Ethernet communications and/or power to sonar electronics 220b. Ethernet communications passing through Ethernet connector 213 are coupled to Ethernet PHY 216, which serves to decode incoming Ethernet communications or encode outgoing digital communications to allow data communications between, for example, sonar controller 230 and user interface/controller 120/130 over Ethernet connection 113. Sonar controller 230 may then send and receive data, control signals, timing signals, and/or other signals to other elements of sonar electronics 220 over signal leads 234.

In some embodiments, Ethernet PHY 216 may be implemented with logic and/or circuitry able to provide hardware support for PTP over Ethernet connector 213, Ethernet connection 113, and to and from various elements of sonar electronics 220b (e.g., including sonar controller 230), as described herein. For example, leads 217 may include cabling and/or PCB traces configured to transmit data communications and/or PTP signals between Ethernet PHY 216 and sonar controller 230. In some embodiments, leads 217 may be routed directly to multiple elements of sonar electronics 220 and/or 220b, such as to a transmitter or receiver of sonar electronics 220, and/or to charging circuit 226 of sonar electronics 220b.

As also shown in the embodiments illustrate by FIG. 2B, Ethernet connector 213 may be configured to provide power to power conditioning circuitry 218, which serves to substantially eliminate any ripple or sinusoidal noise in the power provided through Ethernet connection 113 and generate power rails 222 and 223 used to power sonar electronics 220 and/or 220b. In FIG. 2B, leads 222 are nominally the high voltage leads (e.g., POE VCC leads) and leads 223 are nominally the low voltage leads (e.g., POE 0V leads) or ground reference for sonar electronics 220b. Power conditioning circuitry 218 provides power over high voltage leads 222 (e.g., referenced by ground leads 223) to POE power supply unit 224, which is configured to provide power (e.g., filtered and/or regulated power at one or more different voltages, typically 5V and/or 3.3V) to various integrated circuitry (e.g., relatively low power circuitry) of sonar electronics 220 at least over supply leads 236, including sonar controller 230 and/or other logic devices.

Power conditioning circuitry 218 also provides power over high voltage leads 222 (e.g., referenced by ground leads 223) to charging circuit 226, which is configured to use the power supplied by high voltage leads 222 to charge reservoir circuitry 240. Reservoir circuitry 240 accumulates the charge used to provide the high voltages and currents (e.g., the discharge power) needed (e.g., by a power amplifier/transmitter and/or a signal shaping circuit) to generate an acoustic ensonification from transducer module 260 and delivers the high voltages over power leads 238. In general, signals leads 234, supply leads 236, and power leads 238 are all referenced to ground leads 223, as shown.

In various embodiments, charging circuit 226 may include a current limiter 228 (e.g., controlled and/or monitored by sonar controller 230 over leads 232) configured to limit the current draw from high voltage leads 222 to minimize voltage sag at high voltage leads 222 and/or POE PSU 224 while also minimizing the time needed to charge reservoir circuitry 240 (e.g., sufficiently to source an acoustic ensonification without appreciable transmission signal degradation that would otherwise negatively affect the quality of resulting sonar data and/or imagery).

Charging circuit 226 may also include an isolation circuit or switch 229 (e.g., controlled by sonar controller 230 over leads 232) configured to electrically decouple reservoir circuitry 240 (e.g., and/or a sonar power amplifier/transmitter) from charging circuit 226, power conditioner 218, POE PSU 224, sonar controller 230, and/or other circuitry of sonar electronics 220 and/or 220b during a power transmission or acoustic ensonification, thereby reducing or eliminating the signal transient or noise that would otherwise be fed back into sonar electronics 220b and/or Ethernet connector 213. In some embodiments, isolation circuit 229 may be coupled to ground leads 223 and be configured to decouple or reroute a portion of ground leads 223 to/from reservoir circuitry 240 to minimize ground coupling of such transients or noise into various portions of sonar electronics 220b and/or Ethernet connector 213.

Ethernet connector 213 may be a port or socket configured to electrically couple to Ethernet connector 113 and form a seal against environmental intrusions, such as saltwater, fuel, and/or other environmental liquids and/or fumes. As shown in FIG. 2B, isolation circuitry 214 may be implemented as a set of isolation transformers and/or other circuitry configured to block direct electrical connection between Ethernet connector 213 and Ethernet PHY 216 yet allow data communications to pass from Ethernet connector 213 and Ethernet PHY 216. In alternative embodiments, isolation circuitry 214 may be implemented with one or more optical isolation devices and/or other circuitry configured to provide such isolation to protect operation of Ethernet PHY 216.

Ethernet PHY 216 may be implements as one or more logic devices configured to decode incoming Ethernet communications (from Ethernet connector 213) or encode outgoing digital communications (e.g., from sonar controller 230 and/or other elements of sonar electronics 220) to allow data communications between, for example, sonar controller 230 and user interface/controller 120/130 over Ethernet connection 113 and leads 217. In some embodiments, Ethernet PHY 216 may be implemented with logic and/or circuitry configured to provide hardware support for PTP over Ethernet connector 213, Ethernet connection 113, and to and from various elements of sonar electronics 220b (e.g., including sonar controller 230), as described herein. For example, leads 217 may include dedicated cabling and/or PCB traces configured to transmit PTP signals between Ethernet PHY 216 and sonar controller 230 and/or other elements of sonar electronics 220.

Sonar controller 230 may be implemented similarly to controller 130 and/or portions of sonar electronics 220, for example, and be configured to perform any of the methods described herein, and in particular can be configured to perform any of the processing and/or control methods described with reference to sonar electronics 220 in FIG. 2A. For example, sonar controller 230 may be configured to receive an ensonification schedule and/or timing signals from user interface/controller 120/130 over Ethernet connection 113, Ethernet connector 213, and Ethernet PHY 216 and control various elements (e.g., transmitter, receiver, charging circuit 226) of sonar electronics 220 to acquire sonar data and/or imagery according to the ensonification schedule and/or timing signals. As such, sonar controller 230 may include timing circuitry and/or clocks that can be synchronized to an absolute or relative time along with various other elements of a networkable sonar system, such as networkable sonar system 100 of FIG. 1A. In some embodiments, such ensonification schedule may include various ensonification timings and/or characteristics (e.g., transmission pulse widths, shapes, frequencies, reception timings, and/or other ensonification characteristics).

In various embodiments, sonar controller 230 may be configured to control and/or monitor charging circuit 226 over leads 232. For example, sonar controller 230 may be configured to monitor the voltages on high voltage leads 222 and 238 and control current limiter 228 to minimize voltage sag (e.g., outside an acceptable voltage sag) on high voltage leads 222 and maximize the charge rate of reservoir circuitry 240. In some embodiments, sonar controller 230 may be configured to adjust the charge rate according to a received ensonification schedule and/or timing signal (e.g., generally by reducing the charge rate to reduce the effects of relatively large current transmissions within sonar transducer assembly 112 and/or across Ethernet connection 113). Sonar controller 230 may also be configured to control isolation circuit 229 over leads 232 to decouple reservoir circuit 240 from the rest of sonar electronics 220b and/or 220 during a transmission or acoustic ensonification, as described herein. In some embodiments, such decoupling may occur according to a received ensonification schedule and/or timing signal. In further embodiments, sonar controller 230 may be configured to control charging circuit 226 to charge reservoir circuitry 240 while sonar electronics 220 receives acoustic returns from transducer module 260.

As shown in FIG. 2B, power conditioning circuitry 218 may be implemented as a set of rectifier circuits and/or other circuitry configured to receive noisy power (e.g., power with Ethernet communications/ripple) and provide filtered power over high voltage leads 222 and ground leads 223, as shown. For example, power conditioning circuitry 218 may be configured to remove the Ethernet communications from and/or minimize any ripple in the noisy power received from Ethernet connector 213. In some embodiments, isolation circuitry 214 and power conditioning circuitry 218 may be implemented with complementary circuitry (e.g., the center tapped isolation transformer windings shown in FIG. 2B) to help remove noise and/or ripple from the noisy power. In additional embodiments, power conditioning circuitry 218 may be implemented with various power regulators, capacitors, and/or other circuitry and/or circuit elements to provide relatively clean and/or regulated power over high voltage leads 222 and ground leads 223.

POE PSU may be implemented as any regulated power supply circuitry configured to receive high voltage from power conditioning circuitry 218 over high voltage leads 222 (e.g., referenced to ground leads 223) and provide one or more regulated supply voltages (e.g., typically 3.3 and/or 5V) over supply leads 236 to elements of sonar electronics 220b and/or 220. Charging circuitry 226 may be implemented with various analog circuits and/or logic devices configured to receive high voltage from power conditioning circuitry 218 over high voltage leads 222 and use it to charge reservoir circuitry 240, as described herein. As shown in FIG. 2B, reservoir circuitry 240 may be implemented as one or a bank of multiple capacitors and/or other charge accumulation devices configured to accumulate enough charge to provide the high voltages and currents (e.g., discharge power) over power leads 238 typically needed to generate an acoustic ensonification from transducer module 260.

Current limiter 228 may be implemented with various analog circuits and/or logic devices configured to measure/monitor voltages on leads 222 and/or 236 and reduce and/or discontinue current flow to reservoir circuitry 240 if the measured/monitored voltages fall below a predetermined minimum low voltage sag level. In some embodiments, current limiter 228 may be configured to communicate such measurements/monitoring to sonar controller 230 (e.g., over leads 232) and/or receive control signals from sonar controller 230 adjusting the current flow to reservoir circuitry 240. In other embodiments, current limiter 228 may be configured to operate independently of sonar controller 230.

As shown in FIG. 2B, isolation circuit 229 may be implemented as a controllable switch or other circuitry configured to decouple reservoir circuitry 240 from various other elements of sonar electronics 220B and/or 220 during a transmission or acoustic ensonification. For example, isolation circuit 229 may be configured to electrically isolate leads 238 and/or portions of ground leads 223 from a power amplifier/transmitter and/or transducer module 260 while reservoir circuitry 240 is discharging into transducer module 260 to produce an acoustic ensonification. In some embodiments, isolation circuit 229 may be configured to be controlled by sonar controller 230 over leads 232. In other embodiments, isolation circuitry 240 may be configured to monitor a charge/voltage level of reservoir circuitry 240 and isolate reservoir circuitry 240 upon once the monitored charge/voltage level reaches a predetermined level (e.g., sufficient to power a scheduled acoustic ensonification).

Figure 3:
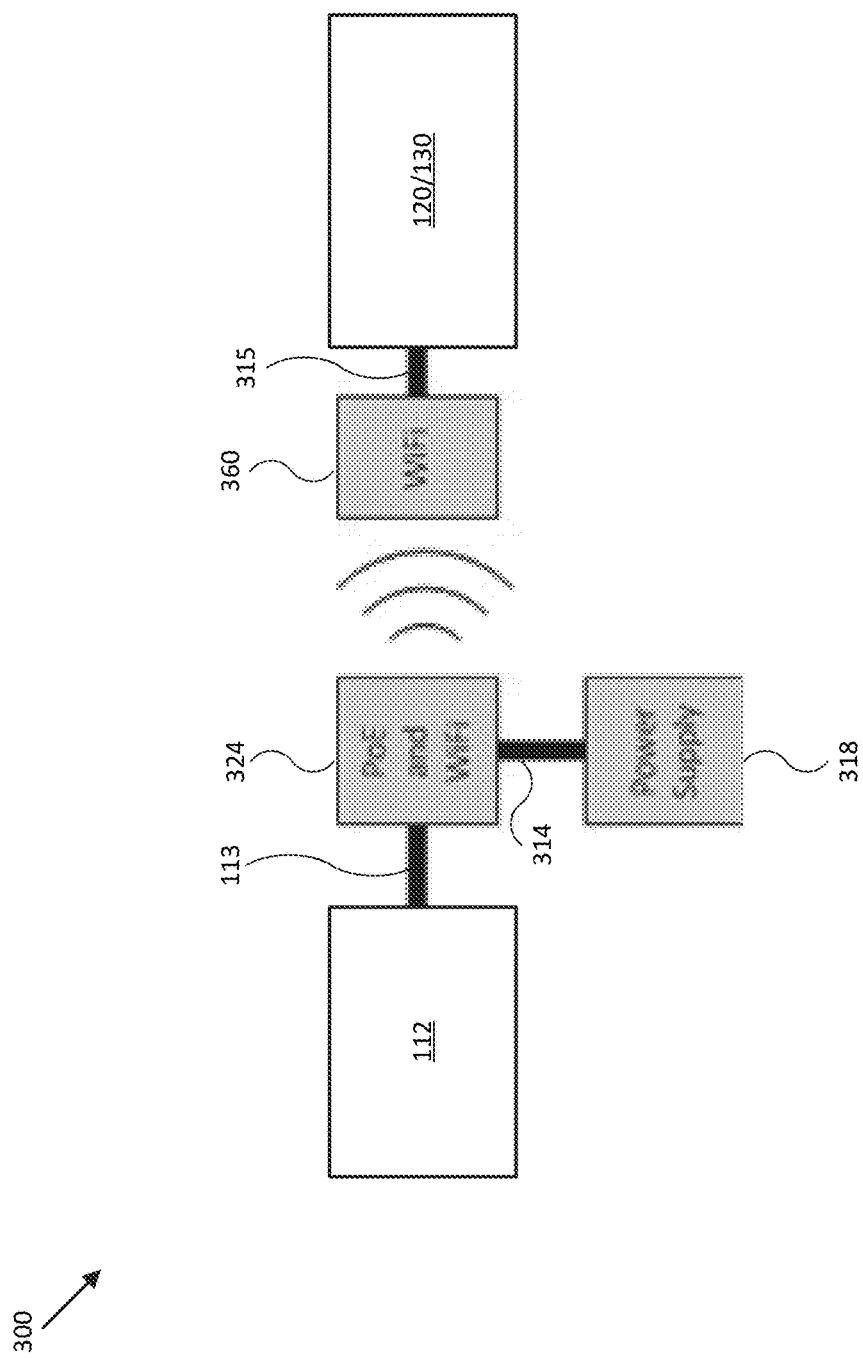
FIG. 3 illustrates a diagram of a networkable sonar system in accordance with an embodiment of the disclosure.

FIG. 3 illustrates a diagram of a networkable sonar system 300 in accordance with an embodiment of the disclosure. As shown in FIG. 3, sonar transducer assembly 112 is configured to communicate with user interface/controller 120/130 wirelessly while receiving power over Ethernet connection 113. For example, sonar transducer assembly 112 may be coupled to wireless access point (WAP) 324 over Ethernet connection 113 and receive power from power supply 318 over leads 314 through WAP 324 and Ethernet connection 113. As described herein, the wireless communications topology illustrated in FIG. 3 may be configured to support data communications as well as synchronization over PTP. WAP 324 is configured to translate Ethernet communications on Ethernet connection 113 to wireless communications that can be transmitted wirelessly between WAP 324 and WAP 360. In the embodiment shown in FIG. 3, WAP 360 translates wireless communications transmitted between WAP 360 and WAP 324 to Ethernet communications on Ethernet connection 315 between WAP 360 and user interface/controller 120/130. In some embodiments, leads 314 and/or Ethernet connection 315 may be implemented as a PoE capable Ethernet connection. For example, WAP 360 may be configured to receive power from user interface/controller 120/130 over Ethernet connection 315.

WAPs 324 and 360 may be configured to communicate wirelessly with each other using any one or multiple wireless communication protocols, including Bluetooth, WiFi, and/or other wireless networking protocols. In some embodiments, WAP 360 may be integrated with user interface/controller 120/130 so as to omit Ethernet connection 315. Power supply 318 may be a PoE power supply configured to power both WAP 324 and sonar transducer assembly 112 over various Ethernet connections, for example, or may be a link to a battery or power plant for a coupled mobile structure (e.g., mobile structure 101) used to power WAP 324, which is then configured to generate and deliver PoE power over Ethernet connection 113. WAP 324 may be coupled directly to sonar transducer assembly 112 or a bracket or mount for sonar transducer assembly 112 so as to be able to transmit above a water line, for example, or may be coupled to a mobile structure and separate from sonar transducer assembly 112, similar to power supply 318. WAP 360, if not integrated with user interface/controller 120/130, may be mounted to any convenient portion of mobile structure 101.

Figure 4:
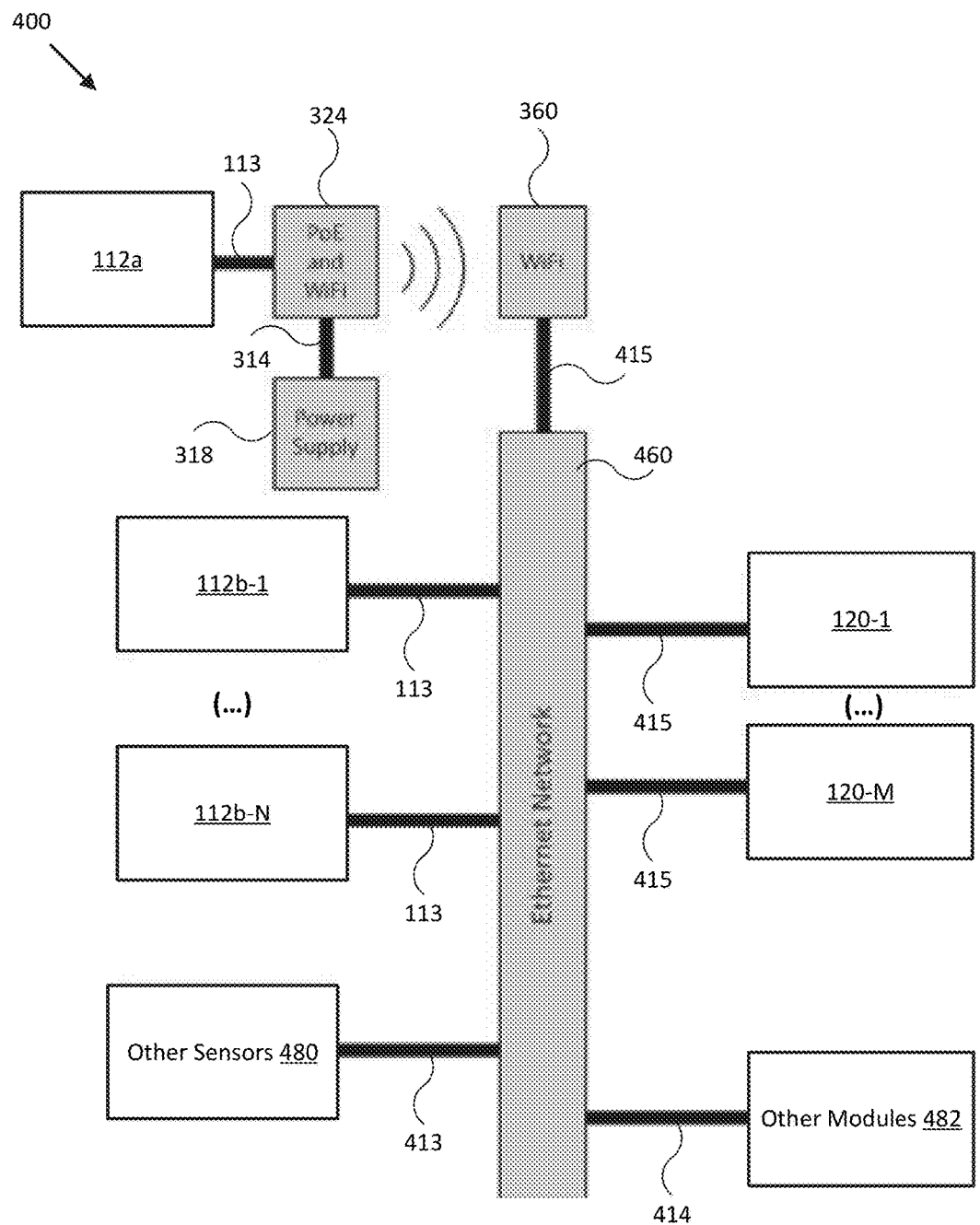
FIG. 4 illustrates a diagram of a networkable sonar system in accordance with an embodiment of the disclosure.

FIG. 4 illustrates a diagram of a networkable sonar system 400 in accordance with an embodiment of the disclosure. As shown in FIG. 4, sonar transducer assembly 112a is configured to communicate with one or more user interfaces 120-1 to M, other sensors 480, other modules 482, and/or other devices of networkable sonar system 400 wirelessly while receiving power over Ethernet connection 113, similar to the network topology shown in FIG. 3, but with the inclusion of Ethernet network device 480 (e.g., an Ethernet switch or hub, for example). Also shown in FIG. 4 is one or more additional sonar transducer assemblies 112b-1 to N, each of which may be configured to communication with each other, user interfaces 120-1 to N, other sensors 480, other modules 482, sonar transducer module 112a, and/or any other devices coupled to Ethernet network device 460. In various embodiments, Ethernet network device 460 may be implemented as a PoE network device and be configured to deliver power to and/or receive power from sonar transducer assemblies 112b-1 to N, other sensors 480, other modules 482, user interfaces 120-1 to M, WAP 360, and/or other devices over Ethernet connections/leads 113, 413, 414, and/or 415, as appropriate.

Other sensors 480 may include orientation and/or position sensors, visible and/or infrared cameras, temperature sensors, and/or any other environmental sensors, such as those described with reference to FIGS. 1A-2B, configured to communicate with any one or multiple user interfaces 120-1 to M. Other modules 482 may include various controllers, actuators, propulsion systems, and/or other elements of system 100 of FIG. 1A, as described herein, which may be configured to communicate with and/or be controlled by any one or multiple user interfaces 120-1 to M.

Figure 5:
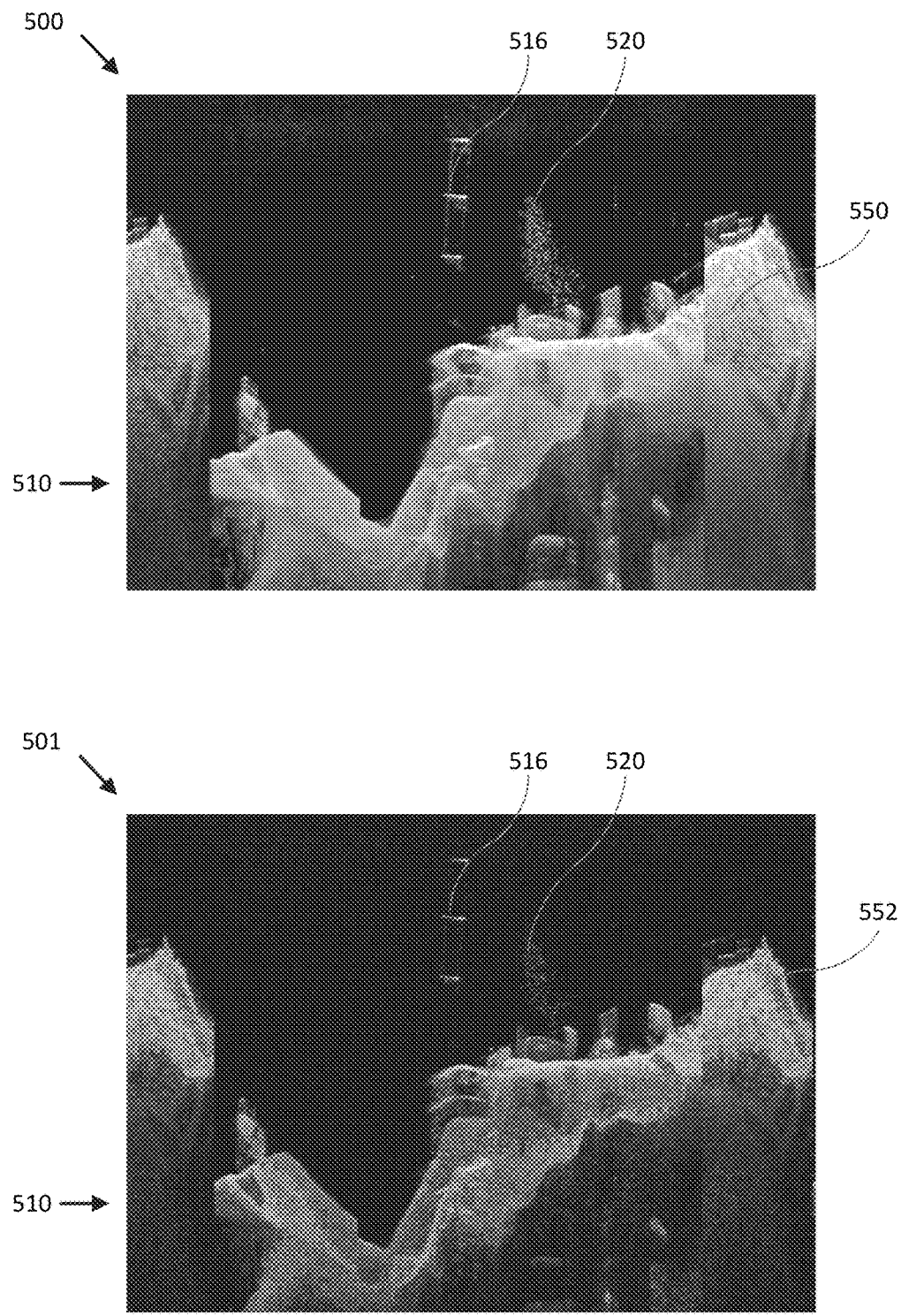
FIG. 5 illustrates various display views of sonar data provided by a networkable sonar system in accordance with embodiments of the disclosure.

FIG. 5 illustrates various display views 500, 501 of sonar data provided by a networkable sonar system in accordance with embodiments of the disclosure. Display views 500 and 501 of FIG. 7 illustrate aggregate side views of a water column and bed ensonified by multiple different transducer modules 260 and/or sonar transducer assemblies 112a and 112b-1 to N of networkable sonar system 400. As shown, display views 500 and 501 include imagery depicting bed 510, net 516, and school of fish 520. In various embodiments, portion 550 of display view 500 may include overlaid, blended, or otherwise combined image data from the multiple transducer modules 260 that partially or completely obscures port or starboard image detail that lie at the same depth. In some embodiments, networkable sonar system 400 may be configured to provide additional image detail by forming display view 501, in which port and starboard data are differentiated graphically, such as through use of differentiated colors (e.g., red for port-side sonar data and green for starboard-side sonar data), as shown in portion 552 of display view 501.

Figure 6A:
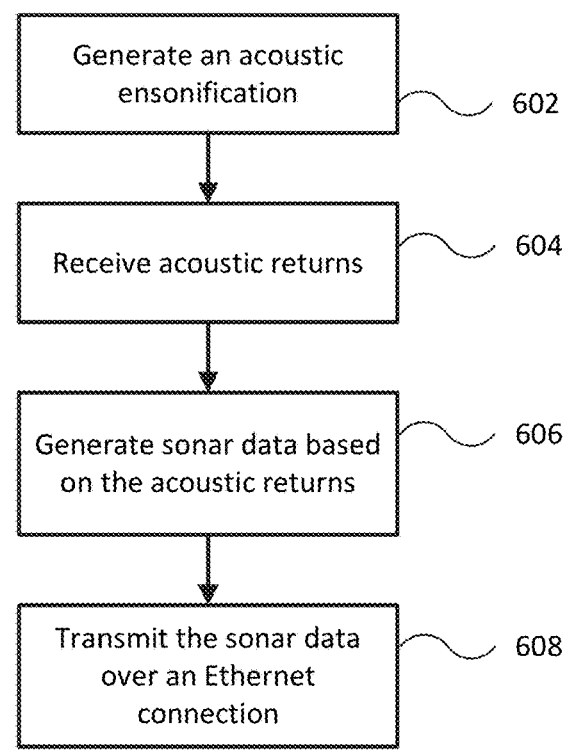
FIG. 6A illustrates a flow diagram of various operations to operate a networkable sonar system in accordance with an embodiment of the disclosure.

FIG. 6A illustrates a flow diagram of various operations to operate a networkable sonar system in accordance with an embodiment of the disclosure. In some embodiments, the operations of FIG. 6A may be implemented as software instructions executed by one or more logic devices associated with corresponding electronic devices, sensors, and/or structures depicted in FIGS. 1A through 4. More generally, the operations of FIG. 6A may be implemented with any combination of software instructions and/or electronic hardware (e.g., inductors, capacitors, amplifiers, actuators, or other analog and/or digital components).

It should be appreciated that any step, sub-step, sub-process, or block of process 600A may be performed in an order or arrangement different from the embodiments illustrated by FIG. 6A. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although process 600A is described with reference to systems 100, 100B, 200, 220b, 300, and/or 400 and FIGS. 1A-4, process 600A may be performed by other systems different from those systems and including a different selection of electronic devices, sensors, assemblies, mobile structures, and/or mobile structure attributes.

Process 600A represents a method for providing sonar data and/or imagery for mobile structure 101 using systems 100, 100B, 200, 220b, 300, and/or 400 in accordance with embodiments of the disclosure. At the initiation of process 600A, various system parameters may be populated by prior execution of a process similar to process 600A, for example, or may be initialized to zero and/or one or more values corresponding to typical, stored, and/or learned values derived from past operation of process 600A, as described herein.

In block 602, an acoustic ensonification is generated. For example, sonar electronics 220 of FIG. 2A may be configured to use transducer module 260 to generate an acoustic ensonification of a water column. In some embodiments, sonar electronics 220 may be configured to synchronize internal timing circuitry to other elements of system 200 (e.g., receive timing signals) and/or receive an ensonification schedule indicating a particular absolute or relative time for the acoustic ensonification and/or other ensonification characteristics, as described herein. Such ensonification characteristics may include transmission signal characteristics, receiver configurations, selections of other sensor measurements to be time stamped and/or collected, and/or other aspects related to an acoustic ensonification. Sonar electronics 220 may be configured to generate an acoustic ensonification according to the received timing signals (e.g., using PTP) and/or the received ensonification schedule. The synchronization accuracy of such acoustic ensonifications, both within sonar electronics 220 and/or between different sonar transducers/systems, may be approximately 10 to 100 microseconds, for example, or may be in the sub microsecond range (e.g., 0.1-0.9) depending on the timing signal and/or protocol implementation, as described herein.

In block 604, acoustic returns are received. For example, sonar electronics 220 may be configured to use transducer module 260 and/or a receiver to receive acoustic returns corresponding to the acoustic ensonification generated in block 602. In some embodiments, sonar electronics 220 may be configured to receive the acoustic returns and/or other sensor data according to an ensonification schedule, as described herein.

In block 606, sonar data is generated. For example, sonar controller 230 of sonar electronics 220b may be configured to process the acoustic returns received in block 604 to generate sonar data. In some embodiments, various processing directives (e.g., selection of processing techniques, sources of data, and/or other directives) may be included in the ensonification schedule potentially received in block 602. In further embodiments, sonar controller 230 and/or other elements of sonar electronics 220 may be configured to receive sensor data over Ethernet connection 113 and use the received sensor data to process the acoustic returns and generate the sonar data.

In block 608, sonar data is transmitted over an Ethernet connection. For example, sonar controller 230 may be configured to transmit the sonar data generated in block 606 through Ethernet connector 213 and over Ethernet connection 113 to one or more logic devices (e.g., user interfaces 120, controller 130, sonar electronics 220, and/or one or more other logic devices of system 100), as described herein. The timing of such transmissions may be included in the ensonification schedule potentially received in block 602. In some embodiments, multiple sonar transmission assemblies 112 may be configured to transmit their individual set of sonar data over their individual Ethernet connections to one or more user interfaces/controllers 120/130, for example, and the user interfaces/controllers 120/130 may be configured to execute a fusor to fuse the different sets of sonar data to generate three dimensional sonar imagery, for example, or to increase the fidelity of the combined sonar data relative to any individual set of sonar data, as described herein. In various embodiments, sonar controller 230, sonar electronics 220, and/or other elements of sonar transducer assembly 112 may be configured to receive power over Ethernet connection 113 in order to perform process 600A.

In some embodiments, sonar system 110 may include a second sonar transducer assembly including a second transducer module, a second housing adapted to be mounted to the mobile structure, and a second sonar electronics disposed within the second housing and configured to control operation of the second sonar transducer assembly, for example, and the second transducer module may itself include a single sonar transducer, multiple independent single sonar transducers, or an array of sonar transducers. In such embodiments, the first sonar transducer assembly and the second sonar transducer assembly may be configured to receive an ensonification schedule from a logic device (e.g., user interface/controller 120/130, sonar electronics 220, or a primary sonar controller 230) over respective Ethernet connections. Such ensonification schedule may include first ensonification characteristics for the first sonar transducer assembly and second ensonification characteristics for the second sonar transducer assembly, as described herein.

For example, the ensonification schedule may include first ensonification characteristics directing the first sonar transducer assembly to generate the acoustic ensonification in block 602 at a first ensonification time (e.g., a relative or absolute time) and second ensonification characteristics directing the second sonar transducer assembly to generate a second acoustic ensonification (e.g., similar to that described in block 602) at the first ensonification time, such that the two sonar transducer assemblies ping at approximately the same time, or at a second ensonification time different from the first ensonification time, so as to stagger ensonifications.

In another example, the ensonification schedule may include first ensonification characteristics directing the first sonar transducer assembly to receive the acoustic returns during a first receiver time period (e.g., a relative or absolute time period over which sonar electronics 220 or sonar controller 230 acquire, sample, and/or digitize acoustic returns) and second ensonification characteristics directing the second sonar transducer assembly to receive second acoustic returns during a the first receiver time period, such that the two sonar transducer assemblies acquire and generate sonar data at approximately the same time and/or based on similarly timed acoustic ensonification(s), or at a second receiver time period different from the first receiver time period, so as to allow for staggered data acquisitions.

In some embodiments, only the first sonar transducer assembly is scheduled to generate an acoustic ensonification, for example, and the sonar transducer assemblies are configured to receive respective first and second acoustic returns based on the single acoustic ensonification. Using techniques such as trilateration and/or multilateration, such acoustic returns and corresponding absolute and/or relative timing characteristics of the acoustic returns may be used to generate a 3D view of a target and/or a floor of a body of water generating the first and second acoustic returns. In alternative embodiments, both sonar transducer assemblies may be scheduled to generate synchronized acoustic ensonifications, and similar techniques may be used to generate such 3D views. More generally, a sonar system may include any number (e.g., 3, 4, 5, 6, 8, 10) of different sonar transducer assemblies mounted at different points to mobile structure 101, for example, and each can be configured to receive an ensonification schedule directing them to synchronize or stagger their ensonification times and/or receiver time periods to generate enhanced sonar data and/or imagery, as described herein.

It is contemplated that any one or combination of methods to provide sonar data and/or imagery may be performed according to one or more operating contexts of a control loop, for example, such as a startup, learning, running, and/or other type operating context. For example, process 600A may proceed back to block 602 and proceed through process 600A again to produce updated sonar data and/or imagery, as in a control loop.

Figure 6B:
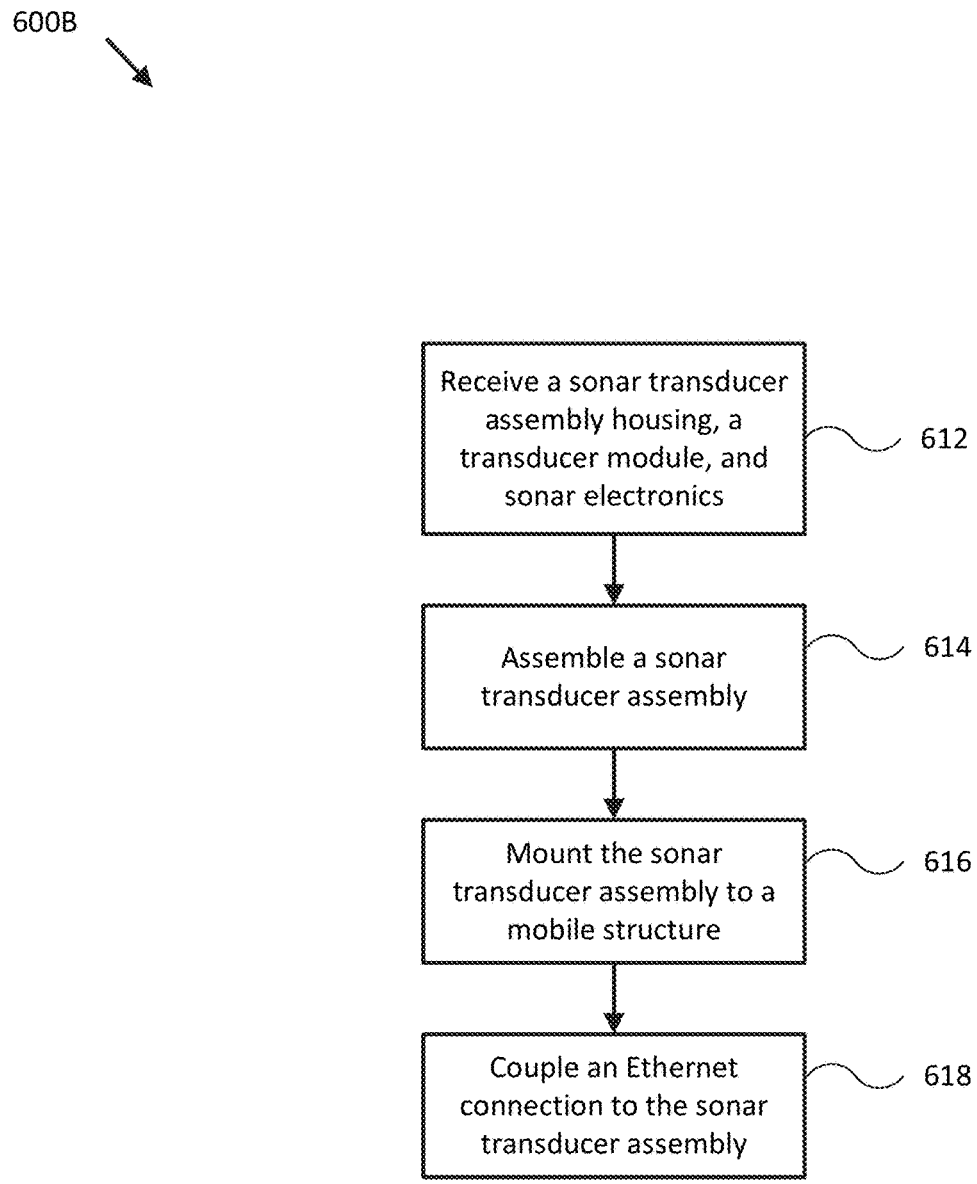
FIG. 6B illustrates a flow diagram of various operations to assemble and/or install a networkable sonar system in accordance with an embodiment of the disclosure.

FIG. 6B illustrates a flow diagram of various operations to assemble and/or install a networkable sonar system in accordance with an embodiment of the disclosure. It should be appreciated that any step, sub-step, sub-process, or block of process 600B may be performed in an order or arrangement different from the embodiments illustrated by FIG. 6B. For example, in other embodiments, one or more blocks may be omitted from the various processes, and blocks from one process may be included in another process. Process 600A represents a method for assembling networkable sonar system 110 and/or installing networkable sonar system 110 onto mobile structure 101 in accordance with embodiments of the disclosure.

In block 612, a sonar transducer assembly housing, a transducer module, and sonar electronics are received. For example, an assembler may be configured to receive sonar transducer assembly housing 211, transducer module 260, and sonar electronics 220 from one or more storage devices. In some embodiments, the assembler may also receive various other modules 280 to be placed within sonar transducer assembly housing 211. In block 614 a sonar transducer assembly is assembled. For example, the assembler of block 612 may be configured to secure transducer module 260, sonar electronics 220, and/or other modules 280 to and/or at least partially within sonar transducer assembly housing 211 and then seal sonar transducer assembly housing 211 against environmental intrusion to assemble sonar transducer assembly housing 211.

In block 616, a sonar transducer assembly is mounted to a mobile structure. For example, an installer may mount sonar transducer assembly 112 to transom 107b of mobile structure 101 using transom mount 114. In other embodiments, the installer may mount sonar transducer assembly 112 directly to hull 105b of mobile structure 101. In further embodiments, the installer may mount multiple embodiments of sonar transducer assembly 112 to various external surfaces of mobile structure 101. In block 618, an Ethernet connection is coupled to a sonar transducer assembly. For example, the installer may couple a first end of Ethernet connection 113 to sonar transducer assembly 112, then couple a second end of Ethernet connection 113 to WAP 324, to Ethernet network device 460, to user interface/controller 120/130, and/or to other Ethernet-enabled devices of system 100. In such embodiments, Ethernet connection 113 may be routed around an outside surface of mobile structure 101, for example, or may be routed through a hole formed in hull 105b or other surface of mobile structure 101. In various embodiments, Ethernet connection 113 may be configured to provide power to sonar transducer assembly 112 and/or to allow software and/or hardware based synchronization between networked devices, as described herein.

It is contemplated that any one or combination of methods to assemble and/or install a networkable sonar system may be performed according to one or more operating contexts of a control loop, for example, such as a startup, learning, running, and/or other type operating context. For example, process 600B may proceed back to block 612 and proceed through process 600B again to assemble and/or install multiple networkable sonar systems, as in a control loop.

Embodiments of the present disclosure can thus provide inexpensive, feature-filled, reliable, compact, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a sonar transducer assembly including a transducer module and a housing adapted to be mounted to a mobile structure;
   sonar electronics disposed within the housing and configured to control operation of the sonar transducer assembly, wherein the sonar electronics are configured to:
      generate an acoustic ensonification;
      receive acoustic returns, corresponding to the generated acoustic ensonification, from the transducer module;
      generate sonar data based, at least in part, on the acoustic returns; and
      transmit the sonar data to a logic device of the mobile structure over, at least in part, an Ethernet connection; and
   a second sonar transducer assembly including a second transducer module, a second housing adapted to be mounted to the mobile structure, and a second sonar electronics disposed within the second housing and configured to control operation of the second sonar transducer assembly, wherein:
      the sonar transducer assembly and the second sonar transducer assembly are configured to receive an ensonification schedule from the logic device over, at least in part, the Ethernet connection; and
      the ensonification schedule comprises at least first ensonification characteristics directing the sonar transducer assembly to generate the acoustic ensonification at a first ensonification time and second ensonification characteristics directing the second sonar transducer assembly to generate a second acoustic ensonification at the first ensonification time or at a second ensonification time different from the first ensonification time; and/or
      the ensonification schedule comprises at least first ensonification characteristics directing the sonar transducer assembly to receive the acoustic returns during a first receiver time period and second ensonification characteristics directing the second sonar transducer assembly to receive second acoustic returns during the first receiver time period or at a second receiver time period different from the first receiver time period.

2. The system of claim 1, wherein:
   the transducer module comprises a single sonar transducer, multiple independent single sonar transducers, or an array of sonar transducers.

3. The system of claim 1, wherein:
   the second transducer module comprises a single sonar transducer, multiple independent single sonar transducers, or an array of sonar transducers.

4. The system of claim 1, wherein:
   the ensonification schedule comprises at least first ensonification characteristics directing the sonar transducer assembly to generate the acoustic ensonification at a first ensonification time and second ensonification characteristics directing the second sonar transducer assembly to generate a second acoustic ensonification at the first ensonification time or at a second ensonification time different from the first ensonification time.

5. The system of claim 1, wherein:
   the ensonification schedule comprises at least first ensonification characteristics directing the sonar transducer assembly to receive the acoustic returns during a first receiver time period and second ensonification characteristics directing the second sonar transducer assembly to receive second acoustic returns during the first receiver time period or at a second receiver time period different from the first receiver time period.

6. The system of claim 1, further comprising one or more additional sonar transducer assemblies, wherein:
   the sonar transducer assembly and the one or more additional sonar transducer assemblies are configured to transmit corresponding sonar data to one or more user interfaces of the mobile structure over, at least in part, corresponding Ethernet connections.

7. The system of claim 6, wherein:
   the sonar transducer assembly and the one or more additional sonar transducer assemblies comprise Ethernet PHYs configured to support a Precision Time Protocol to synchronize operation of their respective transducer modules over, at least in part, the Ethernet connection.

8. The system of claim 1, wherein:
   the sonar electronics comprises a water temperature sensor, a transducer temperature sensor, a water speed sensor, and/or and orientation and/or position sensor.

9. The system of claim 1, further comprising a user interface configured to display the sonar data to a user of the watercraft, wherein:
   the mobile structure comprises a watercraft;
   the Ethernet connection comprises a power over Ethernet connection; and
   the sonar electronics are configured to receive power from the power over Ethernet connection.

10. The system of claim 1, wherein:
    the Ethernet connection comprises a power-over-Ethernet connection;
    the sonar electronics comprise a charging circuit configured to provide at least a portion of the power to a power amplifier coupled to the transducer module to generate the acoustic ensonification; and
    the charging circuit is configured to charge reservoir circuitry while the acoustic returns are received.

11. The system of claim 1, wherein:
    the Ethernet connection terminates into a wireless access point configured to transmit the sonar data wirelessly to one or more user interfaces of the mobile structure.

12. A method comprising:
mounting a sonar transducer assembly to a mobile structure, wherein the sonar transducer assembly comprises a transducer module, a housing, and sonar electronics disposed within the housing and configured to control operation of the sonar transducer assembly;
mounting a second sonar transducer assembly to the mobile structure, wherein the second sonar transducer assembly comprises a second transducer module, a second housing, and second sonar electronics disposed within the second housing and configured to control operation of the second sonar transducer assembly; and
coupling an Ethernet connection to the sonar transducer assembly, wherein the sonar electronics are configured to transmit sonar data to a logic device of the mobile structure over, at least in part, the Ethernet connection, wherein:
the sonar transducer assembly and the second sonar transducer assembly are configured to receive an ensonification schedule from the logic device over, at least in part, the Ethernet connection; and
the ensonification schedule comprises at least first ensonification characteristics directing the sonar transducer assembly to generate the acoustic ensonification at a first ensonification time and second ensonification characteristics directing the second sonar transducer assembly to generate a second acoustic ensonification at the first ensonification time or at a second ensonification time different from the first ensonification time; and/or
the ensonification schedule comprises at least first ensonification characteristics directing the sonar transducer assembly to receive the acoustic returns during a first receiver time period and second ensonification characteristics directing the second sonar transducer assembly to receive second acoustic returns during the first receiver time period or at a second receiver time period different from the first receiver time period.

13. The system of claim 12, wherein:
the Ethernet connection comprises a power over Ethernet connection; and
the sonar electronics are configured to receive power from the power over Ethernet connection.

14. The method of claim 12, wherein:
the Ethernet connection comprises a power over Ethernet connection;
the sonar electronics comprise a charging circuit configured to provide power to a power amplifier coupled to the transducer module; and
the charging circuit is configured to charge one or more reservoir capacitors while acoustic returns are received from the transducer module.

15. The method of claim 12, wherein:
the Ethernet connection terminates into a wireless access point configured to transmit the sonar data wirelessly to one or more user interfaces of the mobile structure; and
the wireless access point is coupled to a power supply configured to provide power over the Ethernet connection to the sonar electronics.

16. The method of claim 12, further comprising:
mounting one or more additional sonar transducer assemblies to the mobile structure; and
coupling additional Ethernet connections to each of the one or more additional sonar transducer assemblies, wherein the sonar transducer assembly and the one or more additional sonar transducer assemblies are configured to transmit corresponding sonar data to one or more user interfaces of the mobile structure over, at least in part, the Ethernet connection and/or the additional Ethernet connections.

17. The method of claim 16, wherein:
the sonar transducer assembly and the one or more additional sonar transducer assemblies comprise Ethernet PHYs configured to support a Precision Time Protocol to synchronize operation of their respective transducer modules over, at least in part, the Ethernet connection.

18. A method comprising:
receiving a sonar transducer assembly housing, a transducer module, and sonar electronics;
coupling the transducer module and the sonar electronics at least partially within the housing to assemble a sonar transducer assembly, wherein the sonar electronics are configured to:
generate an acoustic ensonification;
receive acoustic returns, corresponding to the generated acoustic ensonification, from the transducer module;
generate sonar data based, at least in part, on the acoustic returns; and
transmit the sonar data to a logic device of the mobile structure over, at least in part, an Ethernet connection;
receiving a second sonar transducer assembly housing, a second transducer module, and second sonar electronics; and
coupling the second transducer module and the second sonar electronics at least partially within the second housing to assemble a second sonar transducer assembly, wherein:
the sonar transducer assembly and the second sonar transducer assembly are configured to receive an ensonification schedule from the logic device over, at least in part, the Ethernet connection; and
the ensonification schedule comprises at least first ensonification characteristics directing the sonar transducer assembly to generate the acoustic ensonification at a first ensonification time and second ensonification characteristics directing the second sonar transducer assembly to generate a second acoustic ensonification at the first ensonification time or at a second ensonification time different from the first ensonification time; and/or
the ensonification schedule comprises at least first ensonification characteristics directing the sonar transducer assembly to receive the acoustic returns during a first receiver time period and second ensonification characteristics directing the second sonar transducer assembly to receive second acoustic returns during the first receiver time period or at a second receiver time period different from the first receiver time period.

19. The method of claim 18, wherein:
the Ethernet connection comprises a power-over-Ethernet connection and the sonar electronics are configured to receive power from the power-over-Ethernet connection; and
the sonar electronics comprise a charging circuit configured to provide at least a portion of the power to a power amplifier coupled to the transducer module to generate the acoustic ensonification.

20. The method of claim 18, wherein:
the Ethernet connection terminates into a wireless access point configured to transmit the sonar data wirelessly to one or more user interfaces of the mobile structure; and
the wireless access point is coupled to a power supply configured to provide power over the Ethernet connection to the sonar electronics.

* * * * *